United States Patent
Fukukawa et al.

(10) Patent No.: US 9,856,399 B2
(45) Date of Patent: Jan. 2, 2018

(54) POLYAMIC ACID, VARNISH CONTAINING SAME, AND POLYIMIDE FILM

(71) Applicant: Mitsui Chemicals, Inc., Minato-ku, Tokyo (JP)

(72) Inventors: Kenichi Fukukawa, Tokyo (JP); Masaki Okazaki, Chiba (JP); Yoshihiro Sakata, Ichikawa (JP); Tatsuhiro Urakami, Ichihara (JP); Atsushi Okubo, Tokyo (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/781,931

(22) PCT Filed: Apr. 1, 2014

(86) PCT No.: PCT/JP2014/001911
§ 371 (c)(1),
(2) Date: Oct. 2, 2015

(87) PCT Pub. No.: WO2014/162733
PCT Pub. Date: Oct. 9, 2014

(65) Prior Publication Data
US 2016/0053135 A1 Feb. 25, 2016

(30) Foreign Application Priority Data

Apr. 4, 2013 (JP) .................................. 2013-078569

(51) Int. Cl.
| | | |
|---|---|---|
| *C08G 73/10* | (2006.01) | |
| *C09D 179/08* | (2006.01) | |
| *C08G 73/14* | (2006.01) | |
| *B29C 37/00* | (2006.01) | |
| *B29C 41/02* | (2006.01) | |
| *B29C 41/46* | (2006.01) | |
| *C08J 5/18* | (2006.01) | |
| *B29K 79/00* | (2006.01) | |
| *B29L 7/00* | (2006.01) | |
| *B29L 31/34* | (2006.01) | |

(52) U.S. Cl.
CPC ........ *C09D 179/08* (2013.01); *B29C 37/0025* (2013.01); *B29C 41/02* (2013.01); *B29C 41/46* (2013.01); *C08G 73/1064* (2013.01); *C08G 73/1071* (2013.01); *C08G 73/1078* (2013.01); *C08G 73/1082* (2013.01); *C08G 73/14* (2013.01); *C08J 5/18* (2013.01); *B29K 2079/08* (2013.01); *B29K 2995/0018* (2013.01); *B29K 2995/0097* (2013.01); *B29L 2007/008* (2013.01); *B29L 2031/3475* (2013.01); *C08J 2379/08* (2013.01)

(58) Field of Classification Search
CPC ... G02B 5/3083; G02B 1/115; G02F 1/13363; C08J 2333/24; C08J 2379/08; Y10T 428/31721; B29K 2079/08; B29K 2995/0026; C08G 73/10; B32B 27/281
See application file for complete search history.

(56) References Cited

U.S. PATENT DOCUMENTS

| | | |
|---|---|---|
| 5,009,679 A | 4/1991 | Angus et al. |
| 2006/0055853 A1 | 3/2006 | Murakami et al. |
| 2007/0116899 A1* | 5/2007 | Tyan ...................... C08G 73/10 428/1.3 |

FOREIGN PATENT DOCUMENTS

| | | | |
|---|---|---|---|
| CN | 1672070 A | | 9/2005 |
| JP | 2006-219397 A | | 8/2006 |
| JP | 2008-163107 A | | 7/2008 |
| JP | 2010-202827 | * | 5/2009 |
| JP | 2012-072118 A | | 4/2012 |
| JP | 2012-072121 A | | 4/2012 |
| JP | 2012-072121 | * | 12/2012 |
| JP | 2012-236788 A | | 12/2012 |
| JP | 2013-001899 A | | 1/2013 |

OTHER PUBLICATIONS

International Search Report (PCT/ISA/210) dated Jun. 24, 2014, by the Japanese Patent Office as the International Searching Authority for International Application No. PCT/JP2014/001911.
Jin et al., "Polyimides with Alicyclic Diamines. I. Syntheses and Thermal Properties", Journal of Polymer Science Part A: Polymer Chemistry, 1993, pp. 2345-2351, vol. 31, No. 9.

* cited by examiner

*Primary Examiner* — Gregory Listvoyb
(74) *Attorney, Agent, or Firm* — Buchanan, Ingersoll & Rooney PC

(57) ABSTRACT

The present invention addresses the problem of providing a high-transparency polyimide film in which the thickness-direction phase difference Rth is kept within a predetermined range. The present invention also addresses the problem of providing a polyamic acid and a varnish used to obtain the polyimide film. In order to overcome the aforementioned problem, the present invention is a polyimide film containing a polyimide obtained by bringing about a reaction between a tetracarboxylic dianhydride and a diamine, the polyimide film having (a) a thickness-direction phase difference Rth of −5 to 100 nm per 10 μm of thickness, (b) a transmittance of 80% or more with respect to light having a wavelength of 400 nm, (c) a haze of 3% or less, and (d) a glass transition point of 250° C. or higher.

17 Claims, 1 Drawing Sheet

POLYAMIC ACID, VARNISH CONTAINING SAME, AND POLYIMIDE FILM

TECHNICAL FIELD

The present invention relates to a polyamic acid, a varnish including the same and a polyimide film.

BACKGROUND ART

Inorganic glass, a transparent material, has heretofore been used for panel substrates and the like in displays such as liquid crystal display devices and organic EL display devices. However, inorganic glass has high specific gravity (weight), as well as lower flexibility and impact resistance. In this situation, use of a polyimide film which is lightweight and excellent in impact resistance, workability and flexibility for a panel substrate of a display apparatus has been taken into consideration.

For example, it has been proposed to use a polyimide obtained from an aliphatic tetracarboxylic dianhydride and a diamine for a display substrate (PTL 1). Also, it has been proposed to use a polyimide film synthesized from a diamine and an amide group-containing tetracarboxylic dianhydride derived from 1,2,4-cyclohexanetricarboxylic acid-1,2-anhydride for a display substrate (PTLS 2 to 4).

The panel substrate for a display apparatus requires high light transmittance. In a display apparatus, an image displayed by a device is observed through the panel substrate. Accordingly, the panel substrate also requires a small retardation in the traveling direction of light (thickness direction of the substrate).

CITATION LIST

Patent Literature

PTL 1: Japanese Patent Application Laid-Open No. 2008-163107
PTL 2: Japanese Patent Application Laid-Open No. 2012-72118
PTL 3: Japanese Patent Application Laid-Open No. 2012-72121
PTL 4: Japanese Patent Application Laid-Open No. 2012-236788

SUMMARY OF INVENTION

Technical Problem

The thickness direction retardation Rth of a polyimide film is largely influenced by the orientation of components (repeating units composed of a diamine and a tetracarboxylic dianhydride) constituting a polyimide. Since a conventional polyimide has a structure which is easily oriented in the in-plane direction of a film, it has been difficult to control the thickness direction retardation of the film to fall within a desired range.

The present invention has been achieved in view of such circumstances, and the object of the invention is providing a polyimide film in which the thickness direction retardation Rth is controlled to fall within a desired range and has high transparency, a polyamic acid and a varnish for obtaining the polyimide film, and a method for manufacturing the polyimide film.

Solution to Problem

A first aspect of the present invention relates to polyimide films as set forth below.

[1] A polyimide film containing a polyimide obtained by reacting a tetracarboxylic dianhydride with a diamine, wherein the polyimide film has the following characteristics: (a) a thickness direction retardation Rth as calculated by the below equation of −5 nm or more and 100 nm or less per thickness of 10 μm; (b) a light transmittance at 400 nm wavelength of 80% or more; (c) a haze of 3% or less; and (d) a glass transition temperature of 250° C. or higher, Retardation $Rth$ (nm)=$[nz-(nx+ny)/2] \times d$, wherein nx, ny and nz are respective refractive indexes for x-, y- and z-axis directions of the polyimide film measured using light with a wavelength of 550 nm; and d is a thickness of the polyimide film.

[2] The polyimide film according to [1] containing a polyimide which contains a repeating unit represented by the following general formula (1):

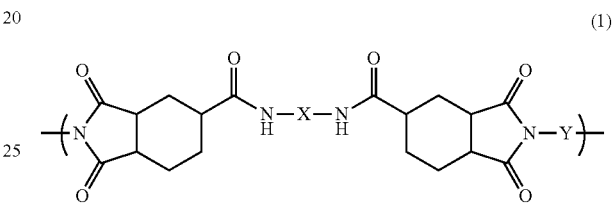

(1)

wherein X is a group selected from the group consisting of:

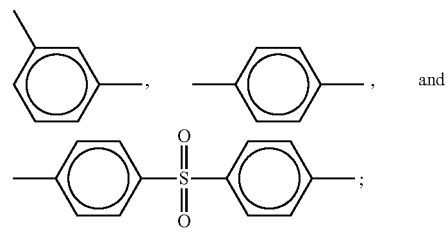

and

Y is a divalent group having 4 to 51 carbon atoms and is an aliphatic group, a monocyclic aliphatic group, a condensed polycyclic aliphatic group, a monocyclic aromatic group or a condensed polycyclic aromatic group; a non-condensed polycyclic aliphatic group in which cyclic aliphatic groups are mutually linked to each other either directly or via a crosslinking member; or a non-condensed polycyclic aromatic group in which aromatic groups are mutually linked to each other either directly or via a crosslinking member (but exclusive of a divalent group derived from 4,4'-diaminodiphenylether).

[3] The polyimide film according to [2], wherein Y of the repeating unit represented by general formula (1) is selected from the group consisting of:

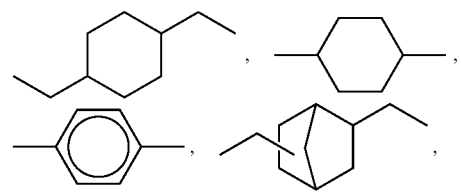

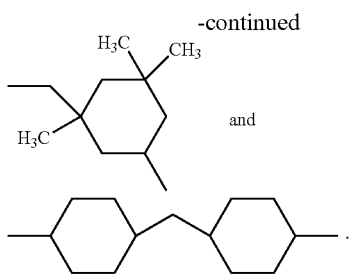
and

[4] The polyimide film according to [1] containing a polyimide which contains a repeating unit represented by the following general formula (2):

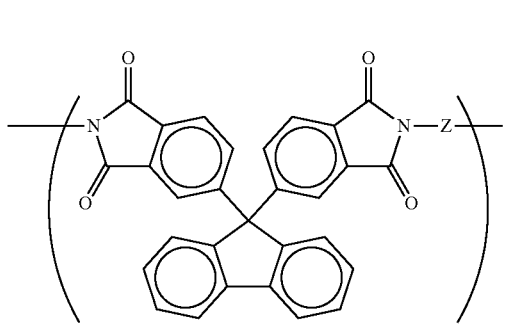

wherein Z is a divalent group having 4 to 51 carbon atoms and is an aliphatic group, a monocyclic aliphatic group, a condensed polycyclic aliphatic group, a monocyclic aromatic group or a condensed polycyclic aromatic group; a non-condensed polycyclic aliphatic group in which cyclic aliphatic groups are mutually linked to each other either directly or via a crosslinking member; or a non-condensed polycyclic aromatic group in which aromatic groups are mutually linked to each other either directly or via a crosslinking member.

[5] The polyimide film according to [4], wherein Z of the repeating unit represented by general formula (2) is selected from the group consisting of:

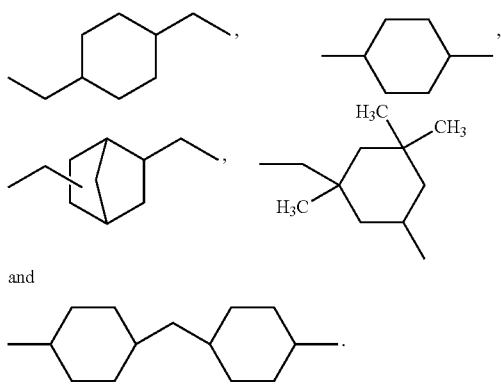

[6] A polyimide film including polyimide layer A and polyimide layer B wherein: either one or both of the polyimide layer A and the polyimide layer B have a thickness direction retardation Rth as calculated by the below equation of −5 nm or more and 100 nm or less per thickness of 10 μm; and the polyimide film has a thickness direction retardation Rth as calculated by the below equation of −5 nm or more and 100 nm or less per thickness of 10 μm, Retardation $Rth$ (nm)=$[nz-(nx+ny)/2]\times d$, wherein nx, ny and nz are respective refractive indexes for x-, y- and z-axis directions of an individual layer contained in the polyimide film or of the polyimide film measured using light with a wavelength of 550 nm; and d is a thickness of each layer in the polyimide film or of the polyimide film.

A second aspect of the present invention relates to polyamic acids, varnishes, and polyimides, as set forth below.

[7] A polyamic acid containing a repeating unit represented by the following general formula (1'):

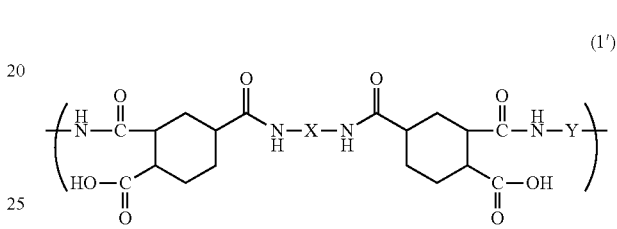

wherein X is selected from the group consisting of:

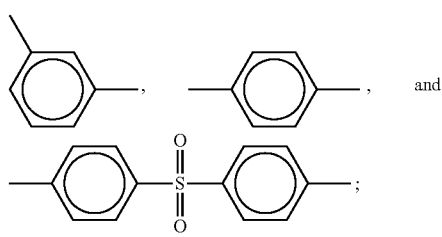

and

Y is a divalent group having 4 to 51 carbon atoms and is an aliphatic group, a monocyclic aliphatic group, a condensed polycyclic aliphatic group, a monocyclic aromatic group or a condensed polycyclic aromatic group; a non-condensed polycyclic aliphatic group in which cyclic aliphatic groups are mutually linked to each other either directly or via a crosslinking member; or a non-condensed polycyclic aromatic group in which aromatic groups are mutually linked to each other either directly or via a crosslinking member (but exclusive of a divalent group derived from 4,4'-diaminodiphenylether).

[8] The polyamic acid according to [7], wherein Y of the repeating unit represented by general formula (1') is selected from the group consisting of:

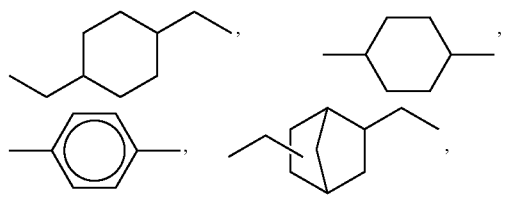

-continued

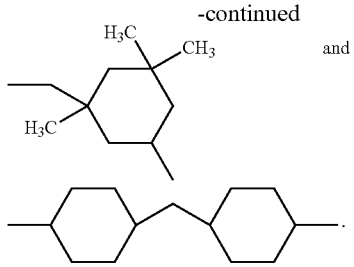

[9] A polyamic acid containing a repeating unit represented by the following general formula (2'):

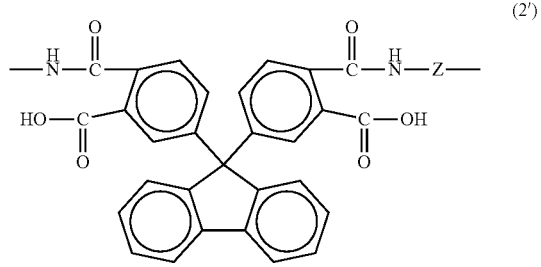

(2')

wherein, Z is a divalent group having 4 to 51 carbon atoms and is an aliphatic group, a monocyclic aliphatic group, a condensed polycyclic aliphatic group, a monocyclic aromatic group or a condensed polycyclic aromatic group; a non-condensed polycyclic aliphatic group in which cyclic aliphatic groups are mutually linked to each other either directly or via a crosslinking member; or a non-condensed polycyclic aromatic group in which aromatic groups are mutually linked to each other either directly or via a crosslinking member.

[10] The polyamic acid according to [9], wherein Z of the repeating unit represented by general formula (2') is selected from the group consisting of:

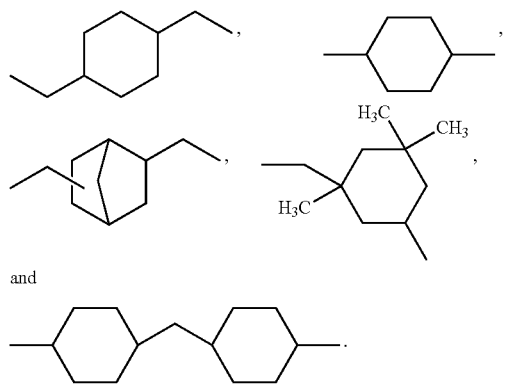

and

[11] A dry film including the polyamic acid according to any one of [7] to [10].
[12] A varnish including the polyamic acid according to any one of [7] to [10].
[13] A polyimide obtained by curing the polyamic acid according to any one of [7] to [10].

A third aspect of the present invention relates to methods of manufacturing a polyimide laminate and a display apparatus, and various display apparatuses, as set forth below.

[14] A method for manufacturing a polyimide laminate in which a substrate and a polyimide layer are laminated, the method including: coating a substrate with the polyamic acid varnish according to [12]; and heating a film of the coated polyamic acid varnish in an inert gas atmosphere.

[15] A method for manufacturing a polyimide laminate in which a substrate and a polyimide layer are laminated, the method including: coating a substrate with the polyamic acid varnish according to [12]; and heating a film of the coated polyamic acid varnish under an atmosphere of 15 kPa or less.

[16] A method for manufacturing a polyimide laminate including a substrate and a polyimide layer, wherein a thickness direction retardation Rth of the polyimide layer as calculated by the below equation is −5 nm or more and 100 nm or less per thickness of 10 μm, the method including: coating a substrate with a varnish containing polyamic acid a and polyamic acid b and heating the resultant coating to thereby obtain the polyimide layer, wherein either one or both of polyamic acid a and polyamic acid b are the polyamic acid according to any one of [7] to [10], Retardation $Rth$ (nm)=$[nz-(nx+ny)/2] \times d$, wherein nx, ny and nz are refractive indexes for x-, y- and z-axis directions of the polyimide layer measured using light with a wavelength of 550 nm; and d is a thickness of the polyimide layer.

[17] A method for manufacturing a polyimide laminate including a substrate, polyimide layer A and polyimide layer B, wherein a thickness direction retardation Rth of a laminate obtained by laminating polyimide layer A and polyimide layer B as calculated by the below equation is −5 nm or more and 100 nm or less per thickness of 10 μm; the method including: coating a substrate with a varnish containing polyamic acid a and heating the resultant coating to thereby obtain the polyimide layer A, and coating onto the polyimide layer A a varnish containing polyamic acid b and heating the resultant coating to thereby obtain the polyimide layer B, wherein either one or both of polyamic acid a and polyamic acid b are the polyamic acid according to any one of [7] to [10], Retardation $Rth$ (nm)=$[nz-(nx+ny)/2] \times d$, wherein nx, ny and nz are respective refractive indexes for x-, y- and z-axis directions of an individual layer contained in the polyimide film or of the polyimide film measured using light with a wavelength of 550 nm; and d is a thickness of each layer of the polyimide film or of the polyimide film.

[18] A polyimide film obtained by peeling off the substrate from the polyimide laminate obtained by the method of any one of [14] to [17].

[19] A method for manufacturing a display apparatus, the method including: peeling off the substrate from the polyimide laminate obtained by the method of any one of [14] to [17] to thereby obtain a polyimide film; and forming a device on the polyimide film.

[20] A method for manufacturing a display apparatus, the method including: forming a device on the polyimide layer of the polyimide laminate obtained by the method of any one of [14] to [17]; and peeling off the polyimide layer on which the device is formed from the substrate.

[21] The method for manufacturing a display apparatus according to [19] or [20], wherein the step of forming a device includes forming a thin film by vapor phase growth method.

[22] A touch panel display obtained by the method for manufacturing a display apparatus according to any one of [19] to [21].
[23] A liquid crystal display obtained by the method for manufacturing a display apparatus according to any one of [19] to [21].
[24] An organic EL display obtained by the method for manufacturing a display apparatus according to any one of [19] to [21].
[25] A touch panel display including the polyimide film according to any one of [1] to [6].
[26] A liquid crystal display including the polyimide film according to any one of [1] to [6].
[27] An organic EL display including the polyimide film according to any one of [1] to [6].

Advantageous Effects of Invention

The polyimide film of the present invention has a thickness direction retardation Rth which is controlled to fall within a desired range and has a high visible light transmittance. Accordingly, the polyimide film of the present invention is applicable to a panel substrate for various display apparatuses.

DESCRIPTION OF EMBODIMENTS

Figure 1A:
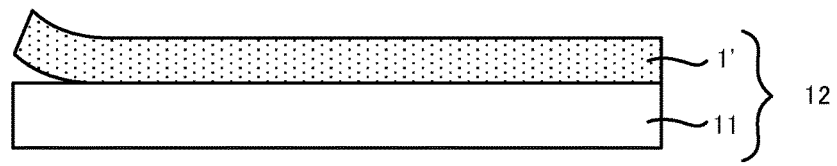
FIGS. 1A and 1B are schematic sectional views illustrating one example of a method for manufacturing a display apparatus using a polyimide laminate of the present invention.

1. Polyimide Film
(1) Physical Properties of Polyimide Film

The present invention relates to a polyimide film applicable to a panel substrate of various display apparatuses.

Conventionally, a polyimide film having a glass transition temperature above a certain temperature generally has a large thickness direction retardation Rth in the negative direction (see below-described Examples). In contrast, the present invention provides a polyimide film having a large thickness direction retardation Rth in the positive direction. Specifically, provided is a polyimide having the thickness direction retardation Rth of −5 nm or more and 100 nm or less, preferably −5 nm or more and 50 nm or less, per thickness of 10 μm.

In some cases, there is a demand for a polyimide film having a thickness direction retardation Rth close to zero. This is because, when the polyimide film is applied to a display apparatus or the like, the closer to 0 nm the thickness direction retardation Rth of the polyimide film is, the less easily distorted the image observed through the polyimide film is. However, as described above, a conventional polyimide film has a large thickness direction retardation Rth in the negative direction, and therefore it has been difficult to bring the retardation closer to 0 nm. In contrast, the present invention also provides a polyimide film with the thickness direction retardation Rth in the vicinity of zero (an absolute value of the thickness direction retardation is 5 nm or less per thickness of 10 μm). In the present invention, the thickness direction retardation is adjusted by the composition of components (diamine and tetracarboxylic dianhydride) constituting the polyimide.

The above thickness direction retardation Rth can be calculated as follows. An optical material inspection apparatus (model: RETS-100) manufactured by Otsuka Electronics Co., Ltd. or the like is used to measure a refractive index nx in the x-axis direction, a refractive index ny in the y-axis direction and a refractive index nz in the z-axis direction for the film at room temperature (about 20° C.) using light with a wavelength of 550 nm. The thickness direction retardation Rth of the film is calculated by the following equation based on these measurements and the thickness (d) of the film.

$$\text{Retardation } Rth \text{ (nm)} = [nz - (nx + ny)/2] \times d$$

The calculated value is converted into a value per film thickness of 10 μm.

As described above, the thickness direction retardation Rth of a polyimide film is largely influenced by the structure of components constituting the polyimide (a repeating unit composed of a diamine and tetracarboxylic dianhydride). A conventional polyimide has a structure which is easily oriented in the in-plane direction of the film. Therefore, the refractive indexes in the x-axis and y-axis directions tend to become high and the thickness direction retardation Rth calculated by the above equation became large in the negative direction. In contrast, a polyimide containing the below-described repeating unit is difficult to be oriented in the in-plane direction of the film. Therefore, the refractive indexes in the x-axis and y-axis directions tend to become low and the thickness direction retardation Rth calculated by the above equation becomes large in the positive direction.

The polyimide film of the present invention has a haze of 3% or less, preferably 1% or less, and more preferably 0.5% or less. The polyimide film having a small haze is suitable for an optical film. The haze is adjusted in accordance with the heat curing conditions of a polyamic acid at the time of manufacturing the polyimide, the surface roughness, crystallinity or the like of the polyimide film.

Further, the polyimide film of the present invention has a light transmittance at 400 nm wavelength of 80% or more, preferably 82% or more, and more preferably 85% or more. Such polyimide film having a high light transmittance is suitable for an optical film. The light transmittance of the polyimide film is adjusted by the amount of units (imide groups) which are aromatic diamines bound to aromatic tetracarboxylic dianhydrides in the polyimide, and by the conditions for imidizing the polyamic acid during the manufacture of the polyimide. The light transmittance at a wavelength of 400 nm is measured with a spectrophotometer.

Further, the polyimide film of the present invention has a glass transition temperature (Tg) of 250° C. or higher, preferably 270° C. or more, and more preferably 300° C. or higher. When the polyimide film has a glass transition temperature of 250° C. or higher, the polyimide film can be used in applications where higher heat resistance is required. The glass transition temperature of the polyimide film is adjusted according to, for example, the equivalent of an imide group contained in the polyimide, or the structure of a diamine component or a tetracarboxylic dianhydride component constituting the polyimide. The glass transition temperature is measured by a thermomechanical analyzer (TMA).

The thickness of the polyimide film of the present invention is not particularly limited, and is appropriately selected, for example, depending on the applications of the polyimide film. Generally, the thickness of the polyimide film is preferably 0.5 to 100 μm, and more preferably 1 to 50 μm.

(2) Composition of Polyimide

As described above, from the viewpoint of controlling the thickness direction retardation Rth of a film to −5 nm or more, a polyimide preferably contains a repeating unit which is difficult to be oriented in the in-plane direction of the film. Specifically, the polyimide preferably contains the following first repeating unit or second repeating unit.

(2.1) First Repeating Unit

The first repeating unit is represented by the following general formula (1).

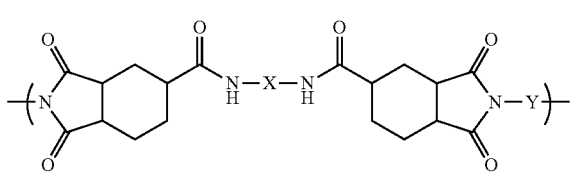
(1)

In general formula (1), X may be one of the groups represented by the following general formulas:

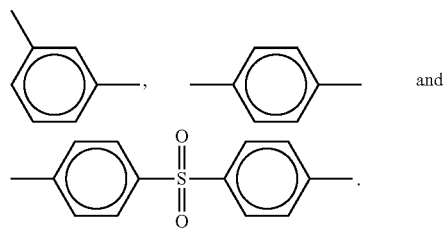
and

The structure represented by the following general formula (1A) contained in the above repeating unit is derived from one of the following tetracarboxylic dianhydrides (1A-1) to (1A-3).

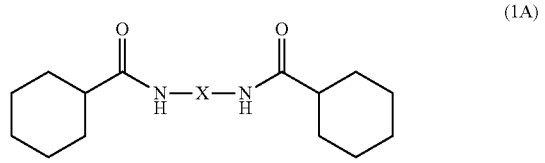
(1A)

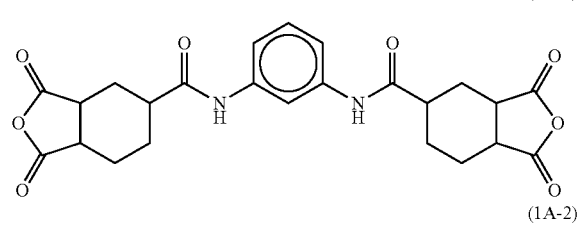
(1A-1)

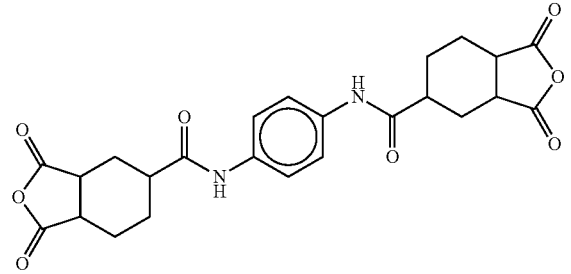
(1A-2)

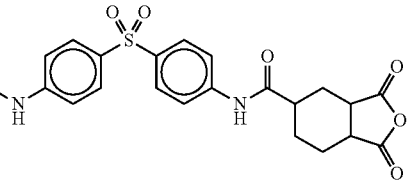
(1A-3)

Y in general formula (1) represents a divalent group having 4 to 51 carbon atoms. Specifically, Y may be an aliphatic group; a monocyclic aliphatic group; a condensed polycyclic aliphatic group; a monocyclic aromatic group; a condensed polycyclic aromatic group; a non-condensed polycyclic aliphatic group in which cyclic aliphatic groups are mutually linked to each other either directly or via a crosslinking member; or a non-condensed polycyclic aromatic group in which aromatic groups are mutually linked to each other either directly or via a crosslinking member (but exclusive of a divalent group derived from 4,4'-diaminodiphenylether).

Y in general formula (1) is derived from a diamine and the diamine is not particularly limited.

First examples of the diamine are diamines having a benzene ring. Examples of the diamine having a benzene ring include:

<1> diamines having one benzene ring, such as p-phenylenediamine, m-phenylenediamine, p-xylylenediamine, and m-xylylenediamine;

<2> diamines having two benzene rings, such as 3,3'-diaminodiphenylether, 3,4'-diaminodiphenylether, 3,3'-diaminodiphenylsulfide, 3,4'-diaminodiphenylsulfide, 4,4'-diaminodiphenylsulfide, 3,3'-diaminodiphenylsulfone, 3,4'-diaminodiphenylsulfone, 4,4'-diaminodiphenylsulfone, 3,3'-diaminobenzophenone, 4,4'-diaminobenzophenone, 3,4'-diaminobenzophenone, 3,3'-diaminodiphenylmethane, 4,4'-diaminodiphenylmethane, 3,4'-diaminodiphenylmethane, 2,2-di(3-aminophenyl)propane, 2,2-di(4-aminophenyl)propane, 2-(3-aminophenyl)-2-(4-aminophenyl)propane, 2,2-di(3-aminophenyl)-1,1,1,3,3,3-hexafluoropropane, 2,2-di(4-aminophenyl)-1,1,1,3,3,3-hexafluoropropane, 2-(3-aminophenyl)-2-(4-aminophenyl)-1,1,1,3,3,3-hexafluoropropane, 1,1-di(3-aminophenyl)-1-phenylethane, 1,1-di(4-aminophenyl)-1-phenylethane, 1-(3-aminophenyl)-1-(4-aminophenyl)-1-phenylethane, and 2,2'-bis(trifluoromethyl)benzidine;

<3> diamines having three benzene rings, such as 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(3-aminobenzoyl)benzene, 1,3-bis(4-aminobenzoyl)benzene, 1,4-bis(3-aminobenzoyl)benzene, 1,4-bis(4-aminobenzoyl)benzene, 1,3-bis(3-amino-α,α-dimethylbenzyl)benzene, 1,3-bis(4-amino-α,α-dimethylbenzyl)benzene, 1,4-bis(3-amino-α,α-dimethylbenzyl)benzene, 1,4-bis(4-amino-α,α-dimethylbenzyl)benzene, 1,3-bis(3-amino-α,α-ditrifluoromethylbenzyl)benzene, 1,3-bis(4-amino-α,α-ditrifluoromethylbenzyl)benzene, 1,4-bis(3-amino-α,α-ditrifluoromethylbenzyl)benzene, 1,4-bis(4-amino-α,α-ditrifluoromethylbenzyl)benzene, 2,6-bis(3-aminophenoxy)benzonitrile, and 2,6-bis(3-aminophenoxy)pyridine;

<4> diamines having four benzene rings, such as 4,4'-bis(3-aminophenoxy)biphenyl, 4,4'-bis(4-aminophenoxy)biphenyl, bis[4-(3-aminophenoxy)phenyl]ketone, bis[4-(4-aminophenoxy)phenyl]ketone, bis[4-(3-aminophenoxy)

phenyl]sulfide, bis[4-(4-aminophenoxy)phenyl]sulfide, bis[4-(3-aminophenoxy)phenyl]sulfone, bis[4-(4-aminophenoxy)phenyl]sulfone, bis[4-(3-aminophenoxy)phenyl]ether, bis[4-(4-aminophenoxy)phenyl]ether, 2,2-bis[4-(3-aminophenoxy)phenyl]propane, 2,2-bis[4-(4-aminophenoxy)phenyl]propane, 2,2-bis[3-(3-aminophenoxy)phenyl]-1,1,1,3,3,3-hexafluoropropane, and 2,2-bis[4-(4-aminophenoxy)phenyl]-1,1,1,3,3,3-hexafluoropropane;

<5> diamines having five benzene rings, such as 1,3-bis[4-(3-aminophenoxy)benzoyl]benzene, 1,3-bis[4-(4-aminophenoxy)benzoyl]benzene, 1,4-bis[4-(3-aminophenoxy)benzoyl]benzene, 1,4-bis[4-(4-aminophenoxy)benzoyl]benzene, 1,3-bis[4-(3-aminophenoxy)-α,α-dimethylbenzyl]benzene, 1,3-bis[4-(4-aminophenoxy)-α,α-dimethylbenzyl]benzene, 1,4-bis[4-(3-aminophenoxy)-α,α-dimethylbenzyl]benzene, and 1,4-bis[4-(4-aminophenoxy)-α,α-dimethylbenzyl]benzene; and <6> diamines having six benzene rings, such as 4,4'-bis[4-(4-aminophenoxy)benzoyl]diphenylether, 4,4'-bis[4-(4-amino-α,α-dimethylbenzyl)phenoxy]benzophenone, 4,4'-bis[4-(4-amino-α,α-dimethylbenzyl)phenoxy]diphenylsulfone, and 4,4'-bis[4-(4-aminophenoxy)phenoxy]diphenylsulfone.

Second examples of the diamine include diamines having an aromatic substituent such as 3,3'-diamino-4,4'-diphenoxybenzophenone, 3,3'-diamino-4,4'-dibiphenoxybenzophenone, 3,3'-diamino-4-phenoxybenzophenone, and 3,3'-diamino-4-biphenoxybenzophenone.

Third examples of the diamine include diamines having a spirobiindan ring such as 6,6'-bis(3-aminophenoxy)-3,3,3',3'-tetramethyl-1,1'-spirobiindan, and 6,6'-bis(4-aminophenoxy)-3,3,3',3'-tetramethyl-1,1'-spirobiindan.

Fourth examples of the diamine include siloxane diamines such as 1,3-bis(3-aminopropyl)tetramethyldisiloxane, 1,3-bis(4-aminobutyl)tetramethyldisiloxane, α,ω-bis(3-aminopropyl)polydimethylsiloxane, and α,ω-bis(3-aminobutyl)polydimethylsiloxane.

Fifth examples of the diamine include ethylene glycol diamines such as bis(aminomethyl)ether, bis(2-aminoethyl)ether, bis(3-aminopropyl)ether, bis[(2-aminomethoxy)ethyl]ether, bis[2-(2-aminoethoxy)ethyl]ether, bis[2-(3-aminopropoxy)ethyl]ether, 1,2-bis(aminomethoxy)ethane, 1,2-bis(2-aminoethoxy)ethane, 1,2-bis[2-(aminomethoxy)ethoxy]ethane, 1,2-bis[2-(2-aminoethoxy)ethoxy]ethane, ethylene glycol bis(3-aminopropyl)ether, diethylene glycol bis(3-aminopropyl)ether, and triethylene glycol bis(3-aminopropyl)ether.

Sixth examples of the diamine include alkylenediamines such as ethylenediamine, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, and 1,12-diaminododecane.

Seventh examples of the diamine include alicyclic diamines such as 1,4-cyclohexanediamine, 1,4-bis(aminomethyl)cyclohexane, cyclobutanediamine, di(aminomethyl)cyclohexanes[bis(aminomethyl)cyclohexanes such as trans-1,4-bis(aminomethyl)cyclohexane, 1,3-bis(aminomethyl)cyclohexane], diaminobicycloheptane, diaminomethylbicycloheptane (including norbornanediamines such as norbornanediamine), diaminooxybicycloheptane, diaminomethyloxybicycloheptane (including oxanorbornanediamine), isophoronediamine, diaminotricyclodecane, diaminomethyltricyclodecane, bis(aminocyclohexyl)methane [or methylenebis(cyclohex-ylamine)], bis(aminocyclohexyl)isopropylidene, and a hydrogenated product of 4,4'-diaminophenylmethane.

Examples of the diamine further include 1,5-diaminonaphthalene and 9,9-bis(4-aminophenyl)fluorene.

The above diamine is preferably a compound selected from the group consisting of the following compounds:

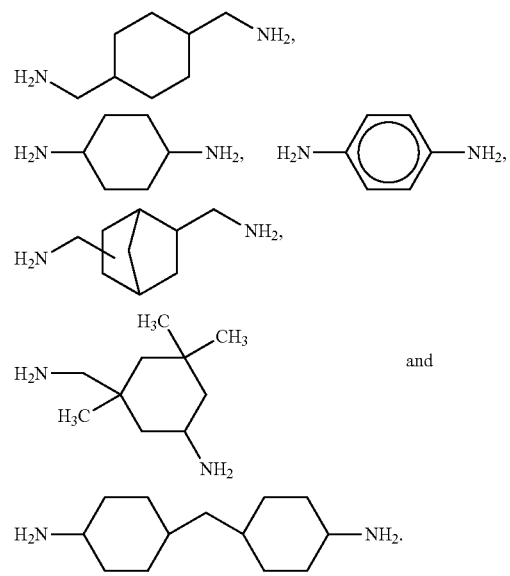

When Y in the general formula (1) is a group derived from one of the above diamines, polyimide is difficult to be oriented in the in-plane direction of a film, and the thickness direction retardation Rth of the film is easily increased. The diamine is preferably an alicyclic diamine; and 1,4-bis(aminomethyl)cyclohexane, bis(aminomethyl)norbornane, isophoronediamine or a hydrogenated product of 4,4'-diaminophenylmethane are particularly preferred. When the diamine is one of these compounds, the degree of freedom of Y in a molecule becomes increased and the polyimide becomes more difficult to be oriented in the above direction.

(2.2) Second Repeating Unit

The second repeating unit is represented by the following general formula (2).

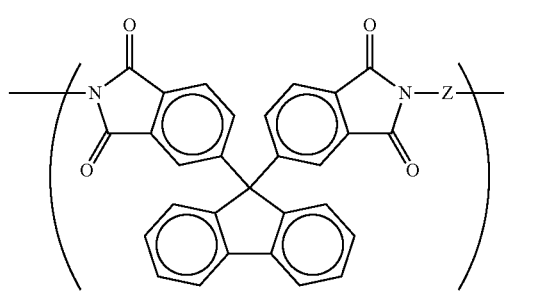

The structure represented by the following general formula (1B) contained in the above repeating unit is derived from the following tetracarboxylic dianhydride (1B-1).

(1B)

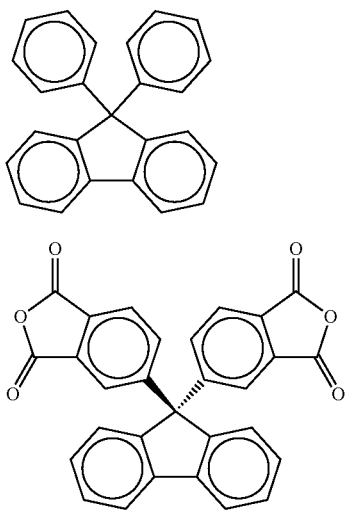

(1B-1)

Z in general formula (2) represents a divalent group having 4 to 51 carbon atoms. Specifically, Z may be an aliphatic group; a monocyclic aliphatic group; a condensed polycyclic aliphatic group; a monocyclic aromatic group; a condensed polycyclic aromatic group; a non-condensed polycyclic aliphatic group in which cyclic aliphatic groups are mutually linked to each other either directly or via a crosslinking member; or a non-condensed polycyclic aromatic group in which aromatic groups are mutually linked to each other either directly or via a crosslinking member.

Z in general formula (2) is derived from a diamine and this diamine is not particularly limited. The diamine may be the same as the diamine from which Y in general formula (1) is derived.

The diamine is preferably an alicyclic diamine, and a compound selected from the group consisting of the following compounds is particularly preferred:

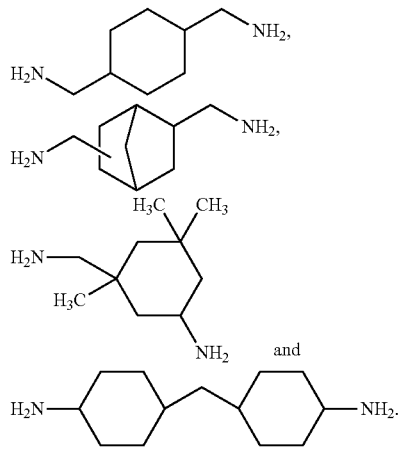

When the diamine is one of these compounds, with respect to Z of general formula (2), the degree of freedom of Z in the molecule becomes increased, and the polyimide becomes difficult to be oriented in the in-plane direction. As a result, the thickness direction retardation Rth of the film becomes increased.

(2.3) Other Repeating Unit

The polyimide constituting the polyimide film may contain another repeating unit other than the first repeating unit or the second repeating unit. Other repeating units may be a repeating unit represented by the following general formula (3).

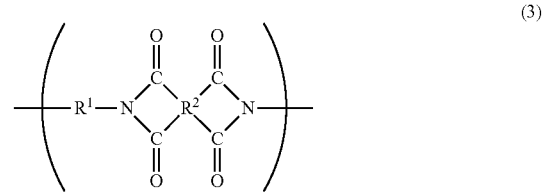

(3)

$R^1$ in general formula (3) represents a divalent group having 4 to 51 carbon atoms. Specifically, $R^1$ may be an aliphatic group; a monocyclic aliphatic group; a condensed polycyclic aliphatic group; a monocyclic aromatic group; a condensed polycyclic aromatic group; a non-condensed polycyclic aliphatic group in which cyclic aliphatic groups are mutually linked to each other either directly or via a crosslinking member; or a non-condensed polycyclic aromatic group in which aromatic groups are mutually linked to each other either directly or via a crosslinking member. $R^1$ in general formula (3) is a group derived from a diamine and is not particularly limited. The diamine from which $R^1$ is derived may be the same as the diamine from which Y in general formula (1) is derived.

$R^2$ in general formula (3) represents a tetravalent organic group having 4 to 27 carbon atoms. $R^2$ may be an aliphatic group; a monocyclic aliphatic group; a condensed polycyclic aliphatic group; a monocyclic aromatic group; a condensed polycyclic aromatic group; a non-condensed polycyclic aliphatic group in which cyclic aliphatic groups are mutually linked to each other either directly or via a crosslinking member (but exclusive of a structure represented by the following general formula (1A')); or a non-condensed polycyclic aromatic group in which aromatic groups are mutually linked to each other either directly or via a crosslinking (but exclusive of a structure represented by the following general formula (1B')).

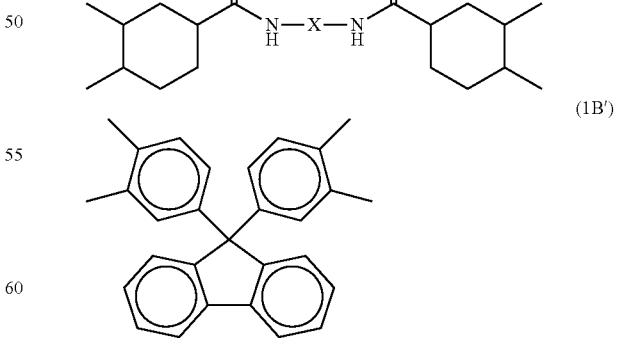

$R^2$ in general formula (3) is derived from a tetracarboxylic dianhydride. The tetracarboxylic dianhydride is not particularly limited, and is preferably an aromatic tetracarboxylic dianhydride or alicyclic tetracarboxylic dianhydride.

Examples of the aromatic tetracarboxylic dianhydride include pyromellitic dianhydride, 3,3',4,4'-biphenyltetracarboxylic dianhydride, 3,3',4,4'-benzophenonetetracarboxylic dianhydride, bis(3,4-dicarboxyphenyl)ether dianhydride, bis(3,4-dicarboxyphenyl)sulfide dianhydride, bis(3,4-dicarboxyphenyl)sulfone dianhydride, bis(3,4-dicarboxyphenyl)methane dianhydride, 2,2-bis(3,4-dicarboxyphenyl)propane dianhydride, 2,2-bis(3,4-dicarboxyphenyl)-1,1,1,3,3,3-hexafluoropropane dianhydride, 1,3-bis(3,4-dicarboxyphenoxy)benzene dianhydride, 1,4-bis(3,4-dicarboxyphenoxy)benzene dianhydride, 4,4'-bis(3,4-dicarboxyphenoxy)biphenyl dianhydride, 2,2-bis[(3,4-dicarboxyphenoxy)phenyl]propane dianhydride, 2,3,6,7-naphthalenetetracarboxylic dianhydride, 1,4,5,8-naphthalenetetracarboxylic dianhydride, 2,2',3,3'-benzophenonetetracarboxylic dianhydride, 2,2',3,3'-biphenyltetracarboxylic dianhydride, 2,2-bis(2,3-dicarboxyphenyl)propane dianhydride, 2,2-bis(2,3-dicarboxyphenyl)-1,1,1,3,3,3-hexafluoropropane dianhydride, bis(2,3-dicarboxyphenyl)ether dianhydride, bis(2,3-dicarboxyphenyl)sulfide dianhydride, bis(2,3-dicarboxyphenyl)sulfone dianhydride, 1,3-bis(2,3-dicarboxyphenoxy)benzene dianhydride, 1,4-bis(2,3-dicarboxyphenoxy)benzene dianhydride, 1,2,5,6-naphthalenetetracarboxylic dianhydride, 1,3-bis(3,4-dicarboxybenzoyl)benzene dianhydride, 1,4-bis(3,4-dicarboxybenzoyl)benzene dianhydride, 1,3-bis(2,3-dicarboxybenzoyl)benzene dianhydride, 1,4-bis(2,3-dicarboxybenzoyl)benzene dianhydride, 4,4'-isophthaloyldiphthalic anhydride, diazodiphenylmethane-3,3',4,4'-tetracarboxylic dianhydride, diazodiphenylmethane-2,2',3,3'-tetracarboxylic dianhydride, 2,3,6,7-thioxanthonetetracarboxylic dianhydride, 2,3,6,7-anthraquinonetetracarboxylic dianhydride, and 2,3,6,7-xanthonetetracarboxylic dianhydride.

Examples of the alicyclic tetracarboxylic dianhydride include cyclobutanetetracarboxylic dianhydride, 1,2,3,4-cyclopentanetetracarboxylic dianhydride, 1,2,4,5-cyclohexanetetracarboxylic dianhydride, bicyclo[2.2.1]heptane-2,3,5,6-tetracarboxylic dianhydride, bicyclo[2.2.2]octo-7-ene-2,3,5,6-tetracarboxylic dianhydride, bicyclo[2.2.2]octane-2,3,5,6-tetracarboxylic dianhydride, 2,3,5-tricarboxycyclopentylacetic dianhydride, bicyclo[2.2.1]heptane-2,3,5-tricarboxylic-6-acetic dianhydride, 1-methyl-3-ethylcyclohexa-1-ene-3-(1,2),5,6-tetracarboxylic dianhydride, decahydro-1,4,5,8-dimethanonapthalene-2,3,6,7-tetracarboxylic dianhydride, 4-(2,5-dioxotetrahydrofuran-3-yl)-tetralin-1,2-dicarboxylic dianhydride, and 3,3',4,4'-dicyclohexyltetracarboxylic dianhydride.

When the tetracarboxylic dianhydride contains an aromatic ring, some or all of the hydrogen atoms in the aromatic ring may be substituted by a fluoro group, a methyl group, a methoxy group, a trifluoromethyl group, a trifluoromethoxy group, or the like. In addition, when the tetracarboxylic dianhydride contains an aromatic ring, a group serving as a crosslinking site selected from an ethynyl group, a benzocyclobutene-4'-yl group, a vinyl group, an allyl group, a cyano group, an isocyanate group, a nitrilo group, an isopropenyl group, and the like may be included in the structure of the tetracarboxylic acid depending on purposes.

In addition to the above-mentioned tetracarboxylic dianhydride, other repeating units may contain a hexacarboxylic trianhydride or an octacarboxylic tetraanhydride. When such an anhydride is contained, branched chains are introduced into the resultant polyimide. Other repeating units may contain only one type of an anhydride or two or more types of anhydrides.

(2.4) Preferable Composition of Polyimide

The polyimide contained in the polyimide film of the present invention preferably contains "a repeating unit which enables the thickness direction retardation Rth of a polyimide film to be −5 nm or more and 100 nm or less per thickness of 10 μm when a polyimide film containing only a single type of repeating unit is produced (hereinafter referred to as a specific repeating unit)." The "specific repeating unit" may be selected from the first repeating unit and second repeating unit. More specific examples of the "specific repeating units" include the repeating units of the polyimides described in Examples 1 to 8 below, but are not limited thereto.

The thickness direction retardation Rth of a film consisting of a polyimide containing the specific repeating units is likely to become −5 nm or more. The polyimide may contain one type of the specific repeating unit or two or more types of specific repeating units. The ratio of the total number of the specific repeating units based on the total number of repeating units in the polyimide is preferably 10% or more, and more preferably 30% or more.

A polyimide molecule may contain the specific repeating unit and other repeating unit exclusive of the specific repeating unit. When other repeating units exclusive of the specific repeating unit is contained, the thickness direction retardation Rth of the film becomes lowered, that is, the retardation becomes adjusted towards the negative direction. It is easy to adjust the thickness direction retardation Rth of a film consisting of a polyimide containing a highly aromatic other repeating unit towards the negative direction. On the other hand, it is easy to adjust the thickness direction retardation Rth of a film consisting of a polyimide containing a highly alicyclic other repeating unit towards the positive direction.

(2.5) Polyimide Film

As described above, with respect to the polyimide film of the present invention, the thickness direction retardation Rth can be adjusted to fall within a desired range (e.g. −5 nm or more and 100 nm or less per thickness of 10 μm). There may be three types of polyimide films each having a desired retardation Rth range:

(i) a polyimide film containing only one type of polyimide; the polyimide containing the above specific repeating unit;

(ii) a polyimide film containing two or more types of polyimides; at least one of the polyimides containing the above specific repeating unit; and (iii) a polyimide film being a laminate containing more than two layers of polyimide layers; a polyimide constituting at least one of the polyimide layers contain the above specific repeating unit.

In the polyimide film of embodiment (i), the thickness direction retardation Rth of the film can be adjusted by, for example, the type of the specific repeating unit, or the type and ratio of other repeating units contained in the polyimide molecule.

The polyimide film of embodiment (ii) contains two or more types of polyimides. The polyimide film may contain only one type of polyimide containing the specific repeating unit, or two or more types of polyimides containing the specific repeating unit. A polyimide film may also contain a polyimide not containing the specific repeating unit. The polyimide not containing the specific repeating unit is not particularly limited, and may be a known polyimide. In type (ii) polyimide film, the thickness direction retardation Rth of the film can be adjusted by, for example, the types of the combined polyimides, or the ratio of each polyimide.

The polyimide film of embodiment (iii) contains two or more polyimide layers. These polyimide layers may be in contact with each other, or may include a layer made of another material therebetween. The polyimide film may contain only one layer consisting of a polyimide containing the specific repeating unit, or two or more layers consisting of a polyimide containing the specific repeating unit. The polyimide film may also contain a polyimide not containing the specific repeating unit. The polyimide not containing the specific repeating unit is not particularly limited, and may be a known polyimide. In type (iii) polyimide film, the thickness direction retardation Rth of the film can be adjusted by, for example, the types of the combined polyimides, or the thickness ratio of each polyimide layer.

(3) Method for Manufacturing Polyimide Film

There may be three types of methods for manufacturing the polyimide film of the present invention. The types (i) to (iii) correspond to the above types (i) to (iii) of the polyimide films, respectively:

(i) a method in which a varnish containing only one type of polyamic acid is prepared and is formed into a film;

(ii) a method in which a varnish containing two or more types of polyamic acids is prepared and is formed into a film; and (iii) a method comprising: preparing a varnish containing a specific polyamic acid and forming the varnish into a first film, and preparing another varnish containing another polyamic acid and forming the varnish into a second film on the first film.

(3-1) First Embodiment

The polyimide film manufacturing method of the first embodiment includes the following three steps:

1) preparing a polyamic acid by reacting a diamine component with a tetracarboxylic acid component;

2) coating a substrate with a varnish containing the polyamic acid; and 3) imidization (ring closure) of the polyamic acid that constitute the film of the coated varnish.

(3-1-1) Preparation of Polyamic Acid

A polyamic acid, a precursor of a polyimide, is prepared by reacting a diamine compound with a tetracarboxylic dianhydride compound. The polyamic acid prepared in this embodiment contains at least one of precursors of the above first and second repeating units, and may contain more than two types of the repeating units.

The precursor (polyamic acid) of the first repeating unit is represented by the following general formula (1'):

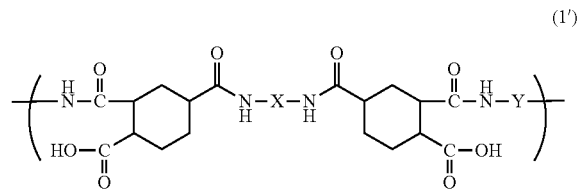

(1')

wherein X and Y are the same as the X and Y of the above general formula (1), respectively.

The polyamic acid containing the precursor of the above first repeating unit is prepared from the above diamine and tetracarboxylic dianhydride components from which the first repeating unit is derived.

The precursor (polyamic acid) of the second repeating unit is represented by the following general formula (2'):

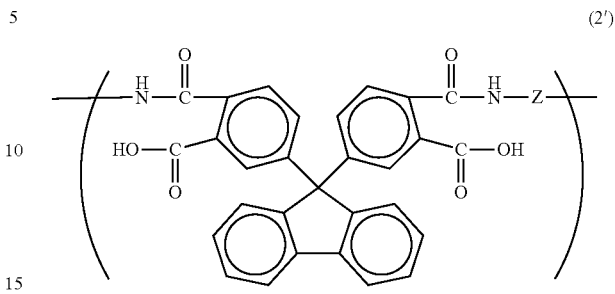

(2')

wherein Z is the same as the Z of the above general formula (2).

The polyamic acid containing the precursor of the above second repeating unit is prepared from the above diamine and tetracarboxylic dianhydride components from which the second repeating unit is derived.

During the preparation of either one of the repeating units, the ratio (y/x) of the total molar amount x of the diamine to the total molar amount y of the tetracarboxylic dianhydride is preferably 0.9 to 1.1, more preferably 0.95 to 1.05, even more preferably 0.97 to 1.03, and particularly preferably 0.99 to 1.01.

The method of polymerizing the diamine component and the tetracarboxylic dianhydride component to obtain a polyamic acid is not particularly limited, and may be a common method. For example, a vessel equipped with a stirrer and a nitrogen inlet is prepared, and the vessel is purged with nitrogen and charged with a solvent. The diamine component is then added such that a polyamic acid to be obtained has a solid content concentration of 50% by mass or less, followed by temperature adjustment and stirring for dissolution. The tetracarboxylic dianhydride component is added to the solution such that the ratio of the tetracarboxylic dianhydride to the diamine component is within the above-mentioned range. Then, stirring is carried out for 1 to 50 hours while adjusting the temperature.

The solvent for preparing the polyamic acid is not particularly limited insofar as the solvent is capable of dissolving the diamine component and the tetracarboxylic dianhydride component. The examples of the solvent include the solvents as listed below.

The examples of the solvent include: phenolic solvents such as phenol, o-chlorophenol, m-chlorophenol, p-chlorophenol, o-cresol, m-cresol, p-cresol, 2,3-xylenol, 2,4-xylenol, 2,5-xylenol, 2,6-xylenol, 3,4-xylenol, and 3,5-xylenol;

aprotic solvents or an equivalent amide-based solvents such as N,N-dimethylformamide, N,N-dimethylacetamide, N,N-diethylacetamide, N-methylacetamide, N-methyl-2-pyrrolidone, 1,3-dimethyl-2-imidazolidinone, N-methylcaprolactum and hexamethylphosphortriamide;

ether based solvents such as 1,2-dimethoxyethane, bis(2-methoxyethyl)ether, 1,2-bis(2-methoxyethoxy)ethane, tetrahydrofuran, bis[2-(2-methoxyethoxy)ethyl]ether, 1,4-dioxane, 2-methoxyethanol, 2-ethoxyethanol, 2-(methoxymethoxy)ethoxyethanol, 2-isopropoxyethanol, 2-butoxyethanol, tetrahydrofurfurylalcohol, diethylene glycol, diethylene glycol monomethyl ether, diethylene glycol monoethyl ether, diethylene glycol monobutyl ether, triethylene glycol, triethylene glycol monoethyl ether, tetraethylene glycol, 1-methoxy-2-propanol, 1-ethoxy-2-propanol, dipropylene glycol, dipropylene glycol monomethyl ether, dipropylene glycol monoethyl ether, tripropylene glycol monomethyl ether, polyethylene glycol, polypropylene glycol and diethylene glycol diethyl ether;

solvents such as pyridine, quinoline, isoquinoline, α-picoline, β-picoline, γ-picoline, isophorone, piperidine, 2,4-lutidine, 2,6-lutidine, trimethylamine, triethylamine, tripropylamine and tributylamine-based solvents;

water-soluble alcohol solvents such as methanol, ethanol, 1-propanol, 2-propanol, tert-butylalcohol, ethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, 1,2,6-hexanetriol, and diacetone-alcohol; and other solvents such as dimethylsulfoxide, dimethylsulfone, diphenyl ether, sulfolane, diphenylsulfone, tetramethylurea, anisole, water, benzene, toluene, o-xylene, m-xylene, p-xylene, chlorobenzene, o-dichlorobenzene, m-dichlorobenzene, p-dichlorobenzene, bromobenzene, o-dibromobenzene, m-dibromobenzene, p-dibromobenzene, o-chlorotoluene, m-chlorotoluene, p-chlorotoluene, o-bromotoluene, m-bromotoluene, p-bromotoluene, acetone, methyl ethyl ketone, methyl isobutyl ketone, cyclopentanone, cyclohexanone, γ-butyrolactone, pentane, hexane, heptane, cyclohexane, dichloromethane, chloroform, tetrachloromethane, fluorobenzene, methyl acetate, ethyl acetate, butyl acetate, methyl formate and ethyl formate.

The solvent is preferably an aprotic solvent or an amide-based solvent, or an equivalent thereof, and more preferably N,N-dimethylformamide, N,N-dimethylacetamide, N,N-diethylacetamide, N-methylacetamide, N-methyl-2-pyrrolidone, 1,3-dimethyl-2-imidazolidinone, N-methylcaprolactum or hexamethylphosphortriamide.

(3-1-2) Coating of Polyamic Acid Varnish

The surface of various substrates, or the like is coated with a varnish containing the above polyamic acid to obtain a thin film shaped varnish. The varnish contains a solvent together with the polyamic acid. The solvent in the varnish may be the same or different from the solvent used for preparing the polyamic acid. The varnish may contain either only one solvent or two or more solvents.

The amount of the polyamic acid contained in the varnish is preferably 1 to 50% by mass, and more preferably 5 to 45% by mass. When the concentration of the polyamic acid exceeds 50% by mass, the viscosity of the varnish becomes excessively high, sometimes making it difficult to coat the substrate with the varnish. On the other hand, when the concentration of the polyamic acid is less than 1% by mass, the viscosity of the varnish becomes too low, sometimes making it impossible to coat the substrate in a desired thickness. In addition, it takes time to dry the solvent, thus, lowering the manufacturing efficiency of the polyimide film.

The substrate coated with the varnish is not particularly limited, insofar as the substrate has solvent resistance and heat resistance. The substrate preferably has excellent peeling-off property with respect to the polyimide layer obtained, and is preferably a glass, or a flexible substrate made of, for example, a metal or a heat-resistant polymer film. Examples of the flexible substrates made of metal include a metal foil made of copper, aluminum, stainless steel, iron, silver, palladium, nickel, chrome, molybdenum, tungsten, zirconium, gold, cobalt, titanium, tantalum, zinc, lead, tin, silicon, bismuth, indium, or an alloy thereof. The surface of the metal foil may be coated with a release agent.

Examples of the flexible substrate made of heat-resistant polymer film include a polyimide film, an aramid film, a polyetheretherketone film, and a polyetherethersulfone film. The flexible substrate made of a heat-resistant polymer film may either contain a release agent or an antistatic agent, or be coated with the release agent or the antistatic agent on its surface. The substrate is preferably a polyimide film, since it has excellent peeling-off property with respect to the obtained polyimide film and has higher heat resistance and solvent resistance.

The shape of the substrate is appropriately selected in accordance with the shape of a polyimide film to be manufactured, and may have either a single sheet shape or an elongated shape. The thickness of the substrate is preferably 5 to 150 μm, and more preferably 10 to 70 μm. When the thickness of the substrate is less than 5 μm, the substrate may become wrinkled or may be split during the coating of the substrate with the varnish.

The method of coating the substrate with the varnish is not particularly limited insofar as the method allows the varnish to be applied at a constant thickness. Examples of the applicator include die coater, comma coater, roll coater, gravure coater, curtain coater, spray coater, and lip coater. The thickness of the film (application thickness) of the coated polyamic acid is appropriately selected depending on the thickness of a polyimide film.

(3-1-3) Imidization of Polyamic Acid

Subsequently, the film of the coated varnish containing a polyamic acid is heated to imidize (conduct ring closure of) the polyamic acid. Specifically, it is preferred that the coating film of the varnish containing the polyamic acid is heated while raising the temperature from 150° C. or less up to more than 200° C., and is further heated at a constant temperature for a constant time.

In general, the imidization temperature for a polyamic acid is 150° C. to 200° C. Therefore, when the temperature of the polyamic acid is increased drastically to 200° C. or more, the polyamic acid at the surface of the coating film becomes imidized before the solvent is volatilized from the coating film. Then, the solvent inside the coating film may cause bubbles, or the coating film surface may have irregularities formed by the release of the solvent to the outside. Accordingly, it is preferred to raise the temperature of the coating film gradually within the range of 150° C. to 200° C. Specifically, the rate of temperature rise within the temperature range of 150° C. to 200° C. is set at preferably 0.25 to 50° C./min., more preferably 1 to 40° C./min., and even more preferably 2 to 30° C./min.

The temperature rise may be either continuous or gradual (sequential), but is preferably continuous, from the viewpoint of suppressing the defective appearance of the polyimide film to be obtained. In addition, throughout the above-mentioned entire temperature range, the rate of temperature rise may be either constant or varied.

An example of a method for heating the single sheet-shaped coating film under the rising temperature condition is a method of raising the temperature inside an oven. In this case, the rate of temperature rise is adjusted by the setting of the oven. In addition, for heating the elongated coating film under the rising temperature conditions, there can be mentioned, for example, a method in which a plurality of heating furnaces for heating the coating film is disposed along a direction in which the substrate is conveyed (moved); and the temperatures of the respective heating furnaces are varied. For example, the temperature of each heating furnace is raised along the direction in which the substrate is being moved. In this case, the rate of temperature rise is adjusted by the conveying speed of the substrate.

The above coating film is preferably heated for a set period of time at a constant temperature after heating the coating film under a rising temperature conditions. The temperature used is satisfactory when the solvent inside the film becomes 0.5% by mass or less as the result of the heating; and the temperature may be equal to or less than the glass transition temperature, but is preferably equal to or higher than the glass transition temperature. The specific heating temperature is preferably 250° C. or higher, and more preferably 270° C. or higher. The heating time is typically about 0.5 to 2 hours.

There is no particular limitation with respect to the heating method used for heating the above-mentioned coating film at a constant temperature, and is heated, for example, by an oven adjusted to a constant temperature. In addition, the elongated coating film is heated by a heating furnace or the like of which temperature is kept constant.

A polyimide is easily oxidized when being heated at a temperature above 200° C. When the polyimide is oxidized, a polyimide film to be obtained is turned yellow, causing the total light transmittance of the polyimide film to be lowered. Therefore, in a temperature range above 200° C., it is preferable to adjust (i) the heating atmosphere to an inert gas atmosphere, or (ii) the heating atmosphere to a reduced pressure.

(i) Making the heating atmosphere to an inert gas atmosphere results in suppression of the oxidation reaction of the polyimide. The type of the inert gas is not particularly limited, and the inert gas may be an argon gas, a nitrogen gas, or the like. In particular, the concentration of oxygen in the temperature range above 200° C. is preferably 5% by volume or less, more preferably 3% by volume or less, and even more preferably 1% by volume or less. The concentration of oxygen in the atmosphere is measured by a commercially available oximeter (e.g. zirconia oxygen analyzer).

(ii) Heating under reduced pressure also suppress the oxidation reaction of the polyimide. When the pressure in the heating atmosphere is reduced, the pressure in the atmosphere is reduced to preferably 15 kPa or less, more preferably 5 kPa or less, and even more preferably 1 kPa or less. When the pressure in the heating atmosphere is reduced, the coating film is heated by a vacuum oven, or the like.

After the imidization (ring closure) of the polyamic acid, the substrate is peeled off, thereby affording a polyimide film. When the polyimide film is peeled off from the substrate, there is a possibility that foreign matters may be adsorbed to the polyimide film due to peeling charge. Accordingly, it is preferable (i) to coat the substrate with an antistatic agent, or (ii) to provide the applicator of the polyamic acid or the peeling device of the polyimide film with a static electricity-removing member (e.g., anti-static bar, anti-static yarn, and ion-blowing static electricity-removing device).

(3-2) Second Embodiment

The polyimide film manufacturing method of the second embodiment includes the following three steps:
1) preparing a varnish containing polyamic acid a and polyamic acid b;
2) coating a substrate with a varnish; and
3) imidization (ring closure) of the polyamic acids a and b that constitute the film of the coated varnish.

(3-2-1) Preparation of Varnish

A varnish containing polyamic acid a and polyamic acid b is prepared. It is sufficient that either one or both of polyamic acid a and polyamic acid b contain a precursor (polyamic acid) of a polyimide containing the above first repeating unit or second repeating unit. That is, either polyamic acid a or polyamic acid b may be a precursor (polyamic acid) of a conventional polyimide that does not contain the above first repeating unit or second repeating unit. A method for preparing the precursor (polyamic acid) of the polyimide containing the above first repeating unit or second repeating unit may be the same as the method for preparing the polyamic acid in the first embodiment. A method for preparing a precursor (polyamic acid) of a conventional polyimide is not particularly limited, and may be a conventional method.

The varnish contains a solvent together with polyamic acid a and polyamic acid b. The solvent contained in the varnish may be either the same as the solvent used for preparing each polyamic acid, or a different solvent. The varnish may contain either only one solvent or two or more solvents. The solvent contained in the varnish may be the same as the solvent contained in the varnish of the first embodiment.

The method for preparing the varnish containing polyamic acid a and polyamic acid b is not particularly limited, and it is generally a method in which a varnish containing polyamic acid a and a varnish containing polyamic acid b are prepared separately, and the varnishes are mixed together. The total amount of polyamic acid a and polyamic acid b contained in the varnish is preferably 1 to 50% by mass, and more preferably 5 to 45% by mass. When the total amount of the polyamic acid exceeds 50% by mass, the viscosity of the varnish becomes excessively high, making it sometimes difficult to coat the substrate with the varnish. On the other hand, when the concentration of the polyamic acid is less than 1% by mass, the viscosity of the varnish becomes excessively low, making it sometimes impossible to coat the substrate in a desired thickness. In addition, it takes time to dry the solvent, thus lowering the manufacturing efficiency of the polyimide film.

(3-2-2) Coating of Varnish

The surface of various substrates or the like is coated with the above varnish containing polyamic acid a and polyamic acid b to obtain a thin film. The substrate to be coated with the varnish is not particularly limited and may be the same as the substrate used in the first embodiment. Also, a method for applying the varnish is not particularly limited and may be the same as the method used for applying a varnish in the first embodiment.

(3-2-3) Imidization of Polyamic Acid

Subsequently, the film of the coated varnish containing a polyamic acid is heated to imidize (conduct ring closure of) each of polyamic acid a and polyamic acid b. A method for imidizing polyamic acid a and polyamic acid b is not particularly limited, and a heating temperature or heating time at the time for the imidization of the polyamic acids may be the same as that of the first embodiment.

(3-3) Third Embodiment

The third embodiment for manufacturing a polyimide film includes the following three steps:
1) preparing separately varnish A containing polyamic acid a and varnish B containing polyamic acid b;
2) coating varnish A containing polyamic acid a onto a substrate, followed by imidization (ring closure), to thereby obtain polyimide layer A; and
3) coating varnish B containing polyamic acid b onto thus obtained polyimide layer A, followed by imidization (ring closure), to thereby obtain polyimide layer B.

(3-3-1) Preparation of Varnish

Varnish A containing polyamic acid a and varnish B containing polyamic acid b are prepared separately. It is sufficient that either one or both of polyamic acid a and polyamic acid b contain a precursor (polyamic acid) of a polyimide containing the above first repeating unit or second repeating unit. That is, either polyamic acid a or polyamic acid b may be a precursor (polyamic acid) of a conventional polyimide that does not contain the above first repeating unit or second repeating unit. A method for preparing the precursor (polyamic acid) of the polyimide containing the above first repeating unit or second repeating unit may be the same as the method for preparing the polyamic acid in the first embodiment. A method for preparing a precursor (polyamic acid) of a conventional polyimide is not particularly limited, and may be a conventional method.

Each of varnish A and varnish B contains a solvent together with the polyamic acid. The solvent contained in varnish A or varnish B may be either the same as the solvent used for preparing each polyamic acid, or a different solvent. Each of varnish A and varnish B may contain either only one solvent or two or more solvents. The solvent contained in varnish A or varnish B may be the same as the solvent contained in the varnish of the first embodiment. The concentration of polyamic acid a contained in varnish A or polyamic acid b contained in varnish B may be the same as the varnish concentration of the first embodiment.

(3-3-2) Coating and Imidization (Ring Closure) of Varnish a

The surface of various substrates or the like is coated with the above varnish A containing polyamic acid a to obtain a thin film, followed by imidization (ring closure) of polyamic acid a to obtain polyimide layer A. The substrate to be coated with varnish A is not particularly limited and may be the same as the substrate used in the first embodiment. Also, a method for applying varnish A is not particularly limited and may be the same as the method used for applying a varnish in the first embodiment. Further, a method for imidizing polyamic acid a is not particularly limited, and the heating temperature or heating time at the time of imidization of the polyamic acid may be the same as that of the first embodiment.

(3-3-3) Coating and Imidization (Ring Closure) of Varnish B

The surface of polyimide layer A is coated with varnish B containing polyamic acid b to obtain a thin film, followed by imidization (ring closure) of polyamic acid b to obtain polyimide layer B. A method for applying varnish B is not particularly limited and may be the same as the method for applying a varnish in the first embodiment. Further, a method for imidizing polyamic acid b is not particularly limited, and the heating temperature or heating time at the time of imidization of the polyamic acid may be the same as that of the first embodiment.

(4) Application of Polyimide Film

As described above, the polyimide film of the present invention has a small haze and high light transmittance. Further, the thickness direction retardation Rth can be controlled to fall within a desired range, and it is possible to control the retardation to 0 nm. Therefore, the polyimide film of the present invention is particularly suitable for a panel substrate of a display apparatus. Examples of the display apparatus include a touch panel, a liquid crystal display, and an organic EL display.

The touch panel is typically a panel body composed of (i) a transparent substrate having a transparent electrode (detection electrode layer), (ii) an adhesion layer, and (iii) a transparent substrate having a transparent electrode (driving electrode layer). The above polyimide film can be applied either to the transparent substrate on the side of the detection electrode layer, or to the transparent substrate on the side of the driving electrode layer.

The liquid crystal cell of the liquid crystal display apparatus is typically a panel body having a laminated structure such that (i) a first transparent plate, (ii) a liquid crystal material interposed between transparent electrodes, and (iii) a second transparent plate are sequentially laminated. The polyimide film is applicable either to the first transparent plate or to the second transparent plate. In addition, the polyimide film is also applicable to a substrate for a color filter in the liquid crystal display apparatus.

The organic EL panel is typically a panel in which a transparent substrate, an anode transparent electrode layer, an organic EL layer, a cathode reflective electrode layer, and a counter substrate are sequentially laminated. The polyimide film is applicable either to the transparent substrate or to the counter substrate.

(5) Dry Film

The dry film of the present invention is a film containing the above polyamic acid. The dry film either may be photocurable, or may be thermosetting. In addition, the dry film may be laminated together with a carrier film, and the other surface of the dry film may be protected with a cover film.

The carrier film to be laminated with the dry film is preferably a low moisture permeable film. In addition, when the dry film is photocurable, the carrier film preferably has transmittance to light used for curing the dry film. Examples of such a carrier film include transparent films such as polyethylene terephthalate, polyethylene, and polypropylene. On the other hand, the cover film is not particularly limited insofar as the cover film is a low moisture permeable film.

The dry film may be a film composed only of the polyamic acid, but may include components other than the polyamic acid insofar as they do not impair the effects of the present invention. Other components may be photosensivity-imparting components (such as photopolymerizable compounds, and photopolymerization initiators), inorganic fillers, or the like. The amount of other components based on the total mass of the dry film is preferably 20% by mass or less.

The photopolymerizable compound contained in the dry film may be a compound having a photopolymerizable unsaturated double bond. Examples of the photopolymerizable compound include (meth)acrylates, (meth)acrylic acids, styrene, α-alkylstyrene, and diallylphthalates, with (meth)acrylates being preferred.

Examples of the (meth)acrylates include ethyl(meth)acrylate, butyl (meth)acrylate, 2-hydroxyethyl (meth)acrylate, 2-hydroxypropyl (meth)acrylate, oligoester (meth)monoacrylate, ethylene glycol di(meth)acrylate, polyethylene glycol diacrylate, neopentyl glycol (meth)acrylate, tetramethylolmethane di(meth)acrylate, trimethylolpropane di(meth)acrylate, ditrimethylolpropane tetra(meth)acrylate, pentaerythritol tri(meth)acrylate, dipentaerythritol penta(meth)acrylate, dipentaerythritol hexa(meth)acrylate, 2-hydroxy-1-(meth)acryloxy-3-(meth)acrylate, epoxy acrylate (e.g., bisphenol A type epoxy (meth)acrylate, novolac-type epoxy (meth)acrylate, cresol novolac-type epoxy (meth)acrylate, and carboxyl group-containing cresol novolac-type epoxy (meth)acrylate), and urethane (meth)acrylate.

Examples of the photopolymerization initiator contained in the dry film may include benzophenone, methylbenzophenone, o-benzoyl benzoic acid, benzoylethylether, 2,2-diethoxyacetophenone, and 2,4-diethylthioxanthone; sulfonium salt compounds; and oxime ester compounds. The dry film may further contain a photopolymerization accelerator. Examples of the photopolymerization accelerator include p-dimethylbenzoic acid isoamyl, 4,4-bis(diethylamino)benzophenone, and dimethylethanolamine. The total content of the photopolymerization initiator and the photopolymerization accelerator is preferably about 0.05 to 10% by mass based on the photopolymerizable compound.

Examples of the inorganic filler contained in the dry film include silica, talc, magnesium carbonate, calcium carbonate, natural mica, synthetic mica, aluminum hydroxide, precipitated barium sulfate, precipitated barium carbonate, barium titanate, and barium sulfate. The average particle diameter of the inorganic filler is preferably 10 μm or less, and more preferably 5 μm or less.

The thickness of the dry film is appropriately selected depending on the applications of the dry film. For example, the dry film to be used, for example, for an interlayer insulating layer of a circuit board has a thickness of preferably 1 to 100 μm, and more preferably 5 to 50 μm.

The dry film is obtained by preparing a coating liquid in which the above polyamic acid varnish and another component, as necessary, are mixed, applying the coating liquid to a carrier film and removing a residual solvent.

The application of the coating liquid to the carrier film during the manufacture of the dry film is not particularly limited insofar as it is possible to apply the coating liquid in a constant thickness, and may be similar to the above method for applying the polyamic acid varnish during the manufacture of the polyimide film.

The method for removing the residual solvent from the coating film is not particularly limited, either, and may be, for example, a method in which the coating film is heated at 80° C. to 150° C. (prebaking). At that time, it is preferable to adjust the amount of the residual solvent of the dry film to a predetermined level or less. In order to maintain the solubility of the dry film in a developer (e.g. aqueous alkali solution) within a suitable range, the amount of the residual solvent of the dry film is preferably 3 to 20% by mass, and more preferably the upper limit thereof is 10% by mass or less. When the dry film contains a large amount of the residual solvent, the dry film tends to exhibit a high dissolution rate in the developer.

The amount of the residual solvent of the dry film is specified, for example, by gas chromatography (GC) measurement. For example, it is determined by calculating a peak area corresponding to the solvent from a chart obtained by the GC measurement of the dry film, and collating the calculated peak area with a calibration curve prepared separately.

A GC measurement apparatus may be, for example, an electric furnace type pyrolyzer (e.g. PYR-2A manufactured by Shimadzu Corporation) connected to a gas chromatography mass spectrometer (e.g. GC-8A (column Uniport HP 80/100 KG-02) manufactured by Shimadzu Corporation). The measurement method may be, for example, a method in which the dry film is charged into the electric furnace type pyrolyzer, immediately heating the pyrolyzer to 320° C. to thereby generate volatile components, and assaying the volatile components with the gas chromatography mass spectrometer in which the injector temperature and the detector temperature are set at 200° C. and the column temperature is set at 170° C.

2. Display Apparatus

Figure 1B:
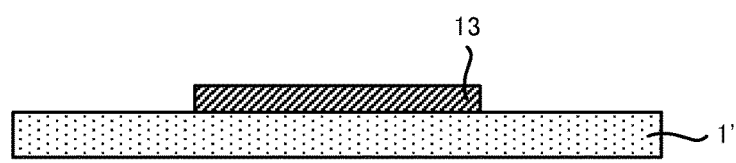

The above various display apparatuses can be manufactured by forming a device on the above polyimide film. When manufacturing the display apparatus, firstly, polyimide laminate 12 in which polyimide layer 1' is laminated on substrate 11 is prepared, as illustrated in FIG. 1A. The method of manufacturing the polyimide laminate 12 may be similar to the above method of manufacturing the polyimide film. Then, polyimide layer 1' is peeled off from polyimide laminate 12 (FIG. 1A); and device 13 is formed on polyimide layer 1' (FIG. 1B). In this case, the device to be formed on polyimide layer 1' may be the electrode layer of the touch panel, the color filter of the liquid crystal display apparatus, the electrode layer or organic EL layer of the organic EL panel, or the like.

The method for forming a device is appropriately selected depending on the type of the device, and an example of such method includes a vapor-phase growth method. The vapor-phase growth method may be a physical vapor deposition method (PVD method) or a chemical vapor deposition method (CVD method). Specifically, the vapor-phase growth method may be a sputtering method, a deposition method, an ion plating method, or the like.

Figure 2A:
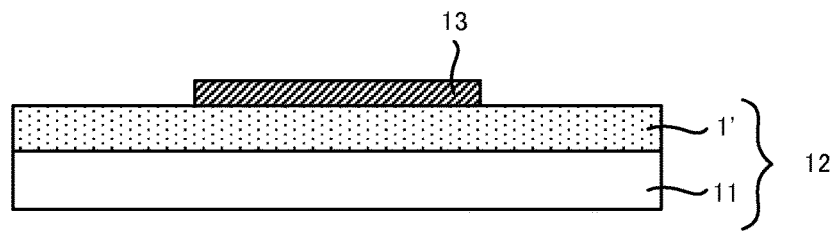
FIGS. 2A, 2B and 2C are schematic sectional views illustrating another example of a method for manufacturing a display apparatus using a polyimide laminate of the present invention.
Figure 2B:
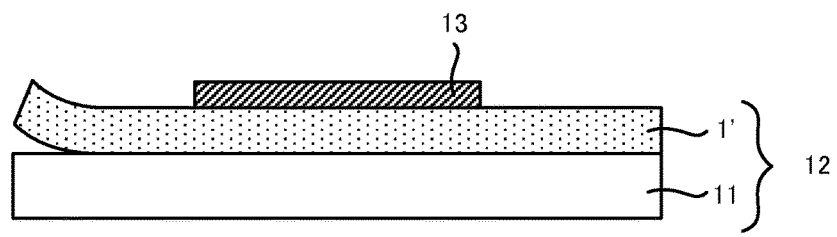
Figure 2C:
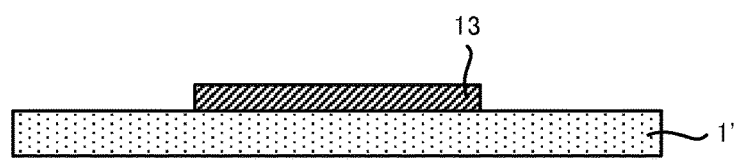

As another example of the method of manufacturing the display apparatus, there can be mentioned a method comprising preparing polyimide laminate 12 in which polyimide layer 1' is laminated on substrate 11, and forming device 13 is on the polyimide layer 1' (FIG. 2A). In this method, polyimide layer 1' is peeled off from substrate 11 after the formation of device 13 (FIG. 2B), thereby obtaining a display apparatus having device 13 formed thereon (FIG. 2C). In this method, stress applied to polyimide layer 1' during the formation of device 13 tends to be absorbed by substrate 11. Accordingly, polyimide layer 1' is less likely to be torn or cracked during the formation of device 13.

EXAMPLES

Hereinafter, the present invention is further described in detail with reference to Examples. However, the technical scope of the present invention is not construed to be limited by these Examples. The respective polyimide films produced in Examples and Comparative Examples were measured for a thickness direction retardation (Rth) per thickness of 10 μm, a light transmittance at 400 nm wavelength, a haze, and a glass transition temperature (Tg) according to the following methods.

1) Calculation of Thickness Direction Retardation (Rth) Per 10 μm

With respect to the polyimide films or polyimide layers produced in Examples and Comparative Examples, a refractive index in the x-axis direction nx, a refractive index in the y-axis direction ny and a refractive index in the z-axis direction nz were measured using light with a wavelength of 550 nm at room temperature (20° C.) using an optical material inspection apparatus (model: RETS-100) manufactured by Otsuka Electronics Co., Ltd. The thickness direction retardation (Rth) was calculated from the refractive index in the x-axis direction nx, the refractive index in the y-axis direction ny and the refractive index in the z-axis direction nz, and the thickness (d) of the film, according to the following formula.

$$Rth\ (nm) = [nz - (nx+ny)/2] \times d$$

The obtained value was converted into a value per thickness (d) of 10 μm.

2) Measurement of Glass Transition Temperature (Tg)

The polyimide films produced in Examples and Comparative Examples were cut to have a width of 4 mm and a length of 20 mm. Tg of the thus obtained samples were measured using a thermal analyzer (TMA-50) manufactured by Shimadzu Corporation.

3) Measurement of Light Transmittance at 400 nm Wavelength Light transmittance at 400 nm wavelength of the polyimide films produced in Examples and Comparative Examples were measured using a spectrophotometer (MultiSpec-1500) manufactured by Shimadzu Corporation.

4) Measurement of Haze

Haze of the polyimide films produced in Examples and Comparative Examples were measured using a haze meter (NDH2000) manufactured by Nippon Denshoku Industries Co., Ltd.

The structures of the compounds used in Examples and Comparative Examples are as follows.

[Tetracarboxylic Dianhydrides]

Anhydride 1

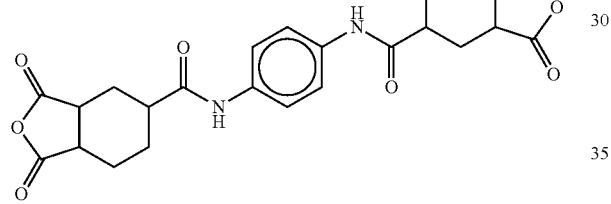

Anhydride 2

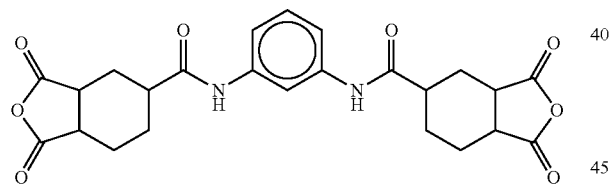

Anhydride 3

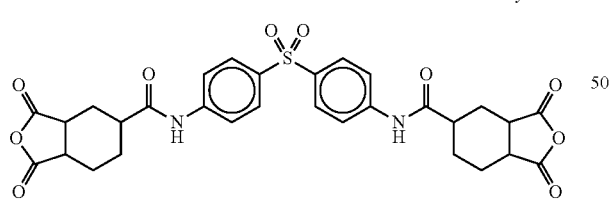

Anhydride 4

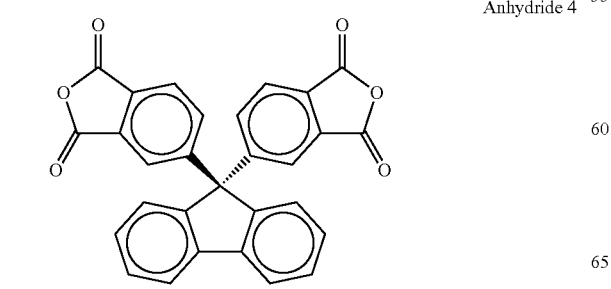

Anhydride 5

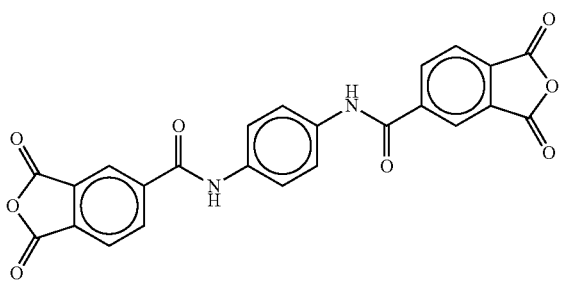

Anhydride 6

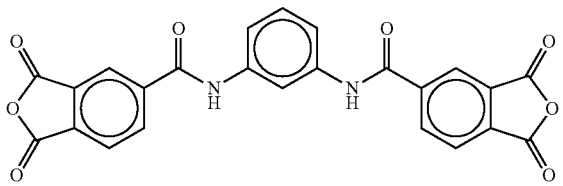

Anhydride 14

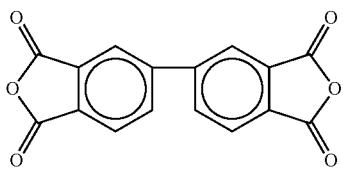

[Diamines]

Diamine 7

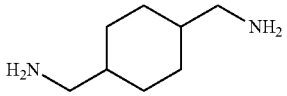

Diamine 8

Diamine 9

Diamine 10

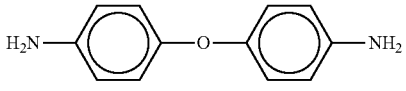

Diamine 11

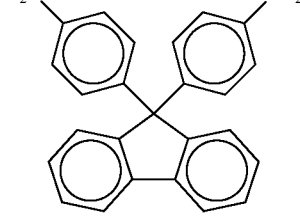

Diamine 12

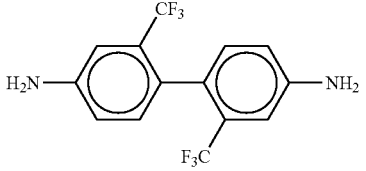

-continued

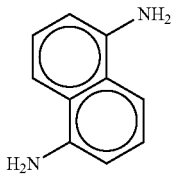

Diamine 13

Example 1

Diamine 7 (0.57 g) and N,N-diethylacetamide (DMAc) (9.77 g) were added into a flask equipped with a nitrogen inlet and a stirring blade, followed by stirring. The cis/trans ratio of diamine 7 was 15/85. Powder of anhydride 1 (1.87 g) was charged into the flask, and stirred while heating to 70° C. to react the compounds and obtain a varnish.

The thus obtained varnish containing a polyamic acid (polyimide precursor polymer) was casted on a glass plate, and the wet gap thereof was adjusted to a predetermined value using a doctor blade and an auto-applicator. The resultant varnish on the glass plate was heated in an inert oven under the conditions such that the temperature is increased at a rate of 3° C./min to 270° C., followed by heating for 2 hours at 270° C. under the pressure of 0.1 MPa (about one atmospheric pressure) to dry the solvent and proceed imidization. The thickness and various physical properties of the thus obtained polyimide film are shown in Table 1.

Example 2

A polyimide film was produced in substantially the same manner as in Example 1 except that the diamine was a mixture of diamine 7 (0.28 g) and diamine 8 (0.23 g), and the solvent was DMAc (9.55 g).

Example 3

A polyimide film was produced in substantially the same manner as in Example 1 except that the diamine was diamine 7 (0.11 g) and diamine 8 (0.37 g), and the solvent was DMAc (9.41 g).

Example 4

A polyimide film was produced in substantially the same manner as in Example 1 except that the diamine was diamine 9 (0.43 g), and the solvent was DMAc (9.23 g).

Example 5

A polyimide film was produced in substantially the same manner as in Example 1 except that the tetracarboxylic dianhydride was anhydride 2 (1.87 g), the diamine was diamine 7 (0.57 g), and the solvent was DMAc (9.77 g).

Example 6

A polyimide film was produced in substantially the same manner as in Example 1 except that the tetracarboxylic dianhydride was anhydride 3 (2.43 g), the diamine was diamine 7 (0.28 g) and diamine 8 (0.23 g), and the solvent was DMAc (11.79 g).

Example 7

A polyimide film was produced in substantially the same manner as in Example 1 except that the tetracarboxylic dianhydride was anhydride 3 (2.43 g), the diamine was diamine 9 (0.43 g), and the solvent was DMAc (11.47 g).

Example 8

A polyimide film was produced in substantially the same manner as in Example 1 except that the tetracarboxylic dianhydride was anhydride 4 (1.83 g), the diamine was diamine 7 (0.57 g), and the solvent was DMAc (9.61 g).

Comparative Example 1

A polyimide film was produced in substantially the same manner as in Example 1 except that the diamine was diamine 10 (0.80 g), and the solvent was DMAc (10.70 g).

Comparative Example 2

A polyimide film was produced in substantially the same manner as in Example 1 except that the diamine was diamine 11 (1.39 g), and the solvent was DMAc (13.07 g).

Comparative Example 3

A polyimide film was produced in substantially the same manner as in Example 1 except that the diamine was diamine 12 (1.28 g), and the solvent was DMAc (12.62 g).

Comparative Example 4

A polyimide film was produced in substantially the same manner as in Example 1 except that the diamine was diamine 13 (0.63 g), and the solvent was DMAc (10.03 g).

Comparative Example 5

A polyimide film was produced in substantially the same manner as in Example 1 except that the tetracarboxylic dianhydride was anhydride 3 (2.43 g), the diamine was diamine 8 (0.46 g), and the solvent was DMAc (11.57 g).

Comparative Example 6

A polyimide film was produced in substantially the same manner as in Example 1 except that the tetracarboxylic dianhydride was anhydride 3 (2.43 g), the diamine was diamine 10 (0.80 g), and the solvent was DMAc (12.94 g).

Comparative Example 7

A polyimide film was produced in substantially the same manner as in Example 1 except that the tetracarboxylic dianhydride was anhydride 3 (2.43 g), the diamine was diamine 12 (1.28 g), and the solvent was DMAc (14.86 g).

Comparative Example 8

A polyimide film was produced in substantially the same manner as in Example 1 except that the tetracarboxylic dianhydride was anhydride 3 (2.43 g), the diamine was diamine 11 (1.39 g), and the solvent was DMAc (15.31 g).

Comparative Example 9

A polyimide film was produced in substantially the same manner as in Example 1 except that the tetracarboxylic dianhydride was anhydride 3 (2.43 g), the diamine was diamine 13 (0.63 g), and the solvent was DMAc (12.27 g).

Comparative Example 10

A polyimide film was produced in substantially the same manner as in Example 1 except that the tetracarboxylic dianhydride was anhydride 6 (1.83 g), the diamine was diamine 7 (0.57 g), and the solvent was DMAc (9.58 g).

Comparative Example 11

A polyimide film was produced in substantially the same manner as in Example 1 except that the tetracarboxylic dianhydride was anhydride 14 (1.18 g), the diamine was diamine 7 (1.87 g), and the solvent was NMP (12.20 g).

contained in the repeating unit or the decrease in the degree of freedom of groups derived from the diamine component in a molecule which enables an easy orientation of the polyimides in the in-plane direction of the film.

Example 9

Varnish A containing polyamic acid a prepared in Example 5 and varnish B containing polyamic acid b prepared in Comparative Example 11 were mixed together so that the molar ratio of the repeating units of polyamic acid a and polyamic acid b becomes 70:30. The resultant varnish was cast on a glass plate in the same manner as in Example 1 and the polyamic acids were imidized to obtain a polyimide film containing polyimide A and polyimide B.

The thickness direction retardation Rth of a film prepared in Example 5 which is solely an imidized polyamic acid a is 20 nm, and the thickness direction retardation Rth of a film prepared in Comparative Example 11 which is solely an imidized polyamic acid b is −42 nm.

Example 10

Varnish A containing polyamic acid a prepared in Example 5 and varnish B containing polyamic acid b prepared in Comparative Example 11 were mixed together so that the molar ratio of the repeating units of polyamic acid a and polyamic acid b becomes 84:16. The resultant varnish was cast on a glass plate in the same manner as in Example 1 and the polyamic acids were imidized to obtain a polyimide film containing polyimide A and polyimide B.

TABLE 1

| | Tetracarboxylic Dianhydride | Diamine (Molar Ratio) | Thickness of Film [μm] | Retardation in Thickness Direction Rth [nm] | Light Transmittance at 400 nm Wavelength [%] | Haze [%] | Tg [° C.] |
|---|---|---|---|---|---|---|---|
| Ex. 1 | 1 | 7 | 21 | 35 | 87 | 0.6 | 251 |
| Ex. 2 | 1 | 7/8 (5/5) | 21 | 37 | 86 | 1.0 | 274 |
| Ex. 3 | 1 | 7/8 (2/8) | 16 | 28 | 85 | 1.0 | 297 |
| Ex. 4 | 1 | 9 | 23 | 16 | 80 | 0.7 | 322 |
| Ex. 5 | 2 | 7 | 24 | 20 | 81 | 0.9 | 252 |
| Ex. 6 | 3 | 7/8 (5/5) | 20 | 9 | 84 | 1.0 | 293 |
| Ex. 7 | 3 | 9 | 29 | −1 | 88 | 0.3 | 334 |
| Ex. 8 | 4 | 7 | 22 | −2 | 83 | 0.9 | 317 |
| Comp. Ex. 1 | 1 | 10 | 20 | −7 | 87 | 0.5 | 289 |
| Comp. Ex. 2 | 1 | 11 | 26 | −6 | 86 | 0.7 | 335 |
| Comp. Ex. 3 | 1 | 12 | 27 | −12 | 88 | 0.6 | 298 |
| Comp. Ex. 4 | 1 | 13 | 26 | −30 | 82 | 0.8 | 283 |
| Comp. Ex. 5 | 3 | 8 | 20 | −7 | 88 | 0.4 | 322 |
| Comp. Ex. 6 | 3 | 10 | 20 | −15 | 87 | 0.4 | 312 |
| Comp. Ex. 7 | 3 | 12 | 43 | −18 | 88 | 0.4 | 323 |
| Comp. Ex. 8 | 3 | 11 | 48 | −7 | 85 | 0.7 | 347 |
| Comp. Ex. 9 | 3 | 13 | 25 | −27 | 83 | 0.8 | 343 |
| Comp. Ex. 10 | 6 | 7 | 21 | −32 | 1.6 | 1.3 | 281 |
| Comp. Ex. 11 | 14 | 7 | 20 | −42 | 88 | 0.4 | 264 |

As shown in Table 1, the thickness direction retardation Rth was −5 nm or more for the polyimide films (Examples 1 to 7) containing a repeating unit (first repeating unit) which is a combination of the specific tetracarboxylic dianhydride (anhydrides 1 to 3) and the specific diamine (diamines 7 to 9). Further, the thickness direction retardation Rth was −2 nm for the polyimide film (Example 8) containing a repeating unit (second repeating unit) which is a combination of the specific tetracarboxylic dianhydride (anhydride 4) and the specific diamine (diamine 7). These polyimides contain the specific repeating units. Therefore, it is deduced that the thickness direction retardation was increased (−5 nm or more) due to the difficulty of the polyimide to be oriented in the in-plane direction of the film.

On the other hand, it is deduced that the increase of the thickness direction retardation Rth of the polyimide film (Comparative Examples 1 to 11) in the negative direction was caused by the increase in the amount of aromatic rings

TABLE 2

| | Polyimide A | | Polyimide B | | Molar Ratio of | | Retardation in | Light | | |
|---|---|---|---|---|---|---|---|---|---|---|
| | Tetracarboxylic Dianhydride | Diamine (Molar Ratio) | Tetracarboxylic Dianhydride | Diamine | Polyimide A and Polyimide B | Thickness of Film [μm] | Thickness Direction Rth [nm] | Transmittance at 400 nm Wavelength [%] | Haze [%] | Tg [° C.] |
| Ex. 9 | 2 | 7 | 14 | 7 | 70/30 | 20 | 4 | 83 | 0.7 | 260 |
| Ex. 10 | 2 | 7 | 14 | 7 | 84/16 | 23 | 12 | 82 | 0.8 | 256 |

As shown in Table 2, when a polyimide film contains together a polyimide having independently a low retardation Rth (negative value) and a polyimide having independently a high retardation Rth (positive value), the thickness direction retardation Rth of the polyimide film was adjusted to a positive value (Examples 9 and 10).

Example 11

Varnish A containing polyamic acid a prepared in Comparative Example 11 was spin cast on a glass plate under the conditions described in Table 3, and polyamic acid a was imidized under the conditions used in Example 1 to obtain polyimide layer A. Subsequently, varnish B containing polyamic acid b prepared in Example 5 was spin cast thereon under the conditions described in Table 3, and polyamic acid b was imidized under the conditions used in Example 1 to obtain polyimide layer B.

The thickness direction retardation Rth of polyimide layer A is −41 nm, and the thickness direction retardation of polyimide layer B is 20 nm.

Comparative Examples 12 and 13

Polyimide layer A and polyimide layer B were formed in substantially the same manner as in Example 11 except that the spin casting conditions of varnish A and varnish B were changed to those described in Table 3.

Comparative Example 14

The polyamic acid a prepared in Comparative Example 11 was spin cast on a glass plate under the conditions described in Table 3, and the polyamic acid was imidized under the conditions used in Example 1 to obtain a polyimide layer.

Comparative Example 15

Varnish A containing polyamic acid a prepared in Comparative Example 11 was spin cast on a glass plate under the conditions described in Table 3, and polyamic acid a was imidized under the conditions used in Example 1 to obtain polyimide layer A. Subsequently, varnish B containing polyamic acid b prepared in Comparative Example 11 (the same as varnish A) was spin cast under the conditions described in Table 3, and polyamic acid b was imidized under the conditions used in Example 1 to obtain polyimide layer B.

TABLE 3

| | Plyimide Layer A | | | | | Polyimide Layer B | | | | |
| --- | --- | --- | --- | --- | --- | --- | --- | --- | --- | --- |
| | Tetracarboxylic Dianhydride | Diamine | Concentration [wt %] | Viscosity [mPa · s] | Spin Casting [rpm] | Tetracarboxylic Dianhydride | Diamine | Concentration [wt %] | Viscosity [mPa · s] | Spin Casting [rpm] |
| Ex. 11 | 14 | 7 | 17 | 4000 | 2400 | 2 | 7 | 20 | 1200 | 800 |
| Comp. Ex. 12 | 14 | 7 | 17 | 4000 | 2400 | 2 | 7 | 20 | 1200 | 1600 |
| Comp. Ex. 13 | 14 | 7 | 17 | 4000 | 2400 | 2 | 7 | 20 | 1200 | 2400 |
| Comp. Ex. 14 | 14 | 7 | 17 | 4000 | 2400 | — | — | — | — | — |
| Comp. Ex. 15 | 14 | 7 | 17 | 4000 | 2400 | 14 | 7 | 17 | 4000 | 1800 |

| | Thickness of Film [μm] (Thickness Ratio of First Layer and Second Layer) | Retardation in Thickness Direction Rth [nm] | Light Transmittance at 400 nm Wavelength [%] | Haze [%] | Tg [° C.] |
| --- | --- | --- | --- | --- | --- |
| Ex. 11 | 27 (6/21) | 4 | 81 | 0.9 | 266 |
| Comp. Ex. 12 | 19 (6/13) | −9 | 83 | 0.8 | 265 |
| Comp. Ex. 13 | 10 (6/4) | −23 | 85 | 0.6 | 265 |
| Comp. Ex. 14 | 6 | −41 | 89 | 0.3 | 264 |
| Comp. Ex. 15 | 15 (6/9) | −42 | 88 | 0.4 | 264 |

As shown in Table 3, a polyimide film having a thickness direction retardation Rth of 4 nm was obtained by laminating polyimide layer A independently having a low thickness direction retardation Rth (−41 nm) and polyimide layer B independently having a relatively high thickness direction retardation Rth (20 nm) (Example 11). On the other hand, the thickness direction retardation Rth of the polyimide film decreased when the thickness ratio of polyimide layer A (having a low thickness direction retardation Rth) was increased (Comparative Examples 12 and 13).

Further, there was hardly no change in the thickness direction retardation Rth of the polyimide film when polyimide layers each independently having a low thickness direction retardation Rth (−41 nm) were laminated together (Comparative Example 15).

INDUSTRIAL APPLICABILITY

In the polyimide film of the present invention, the thickness direction retardation Rth can be controlled to fall within a desired range, and the film exhibits high visible light transmittance. Accordingly, the polyimide film of the present invention is applicable to a panel substrate for various display apparatuses.

REFERENCE SIGNS LIST

1' Polyimide Layer
11 Substrate
12 Polyimide laminate
13 Device

The invention claimed is:
1. A polyimide film comprising a polyimide obtained by reacting a tetracarboxylic dianhydride with a diamine,
wherein the polyimide contains a repeating unit represented by the following general formula (1):

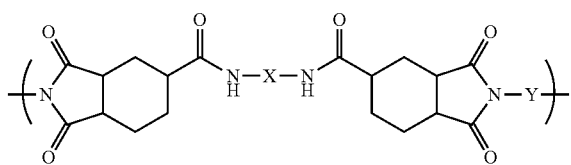
(1)

wherein X is a group selected from the group consisting of:

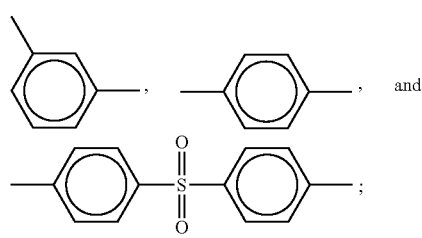

and
Y is a group selected from the group consisting of:

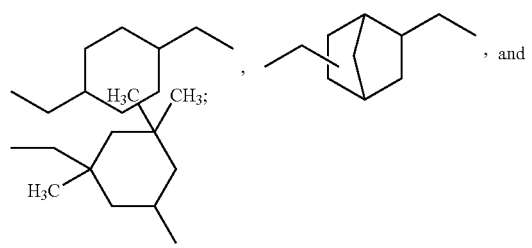

and
wherein the polyimide film has the following characteristics:
(a) a thickness direction retardation Rth as calculated by the below equation of −5 nm or more and 100 nm or less per thickness of 10 μm;
(b) a light transmittance at 400 nm wavelength of 80% or more;
(c) a haze of 3% or less; and
(d) a glass transition temperature of 250° C. or higher, Retardation $Rth$ (nm)$=[nz-(nx+ny)/2]\times d$, wherein nx, ny and nz are respective refractive indexes for x-, y- and z-axis directions of the polyimide film measured using light with a wavelength of 550 nm; and d is a thickness of the polyimide film.

2. A touch panel display comprising the polyimide film according to claim 1.

3. A liquid crystal display comprising the polyimide film according to claim 1.

4. An organic EL display comprising the polyimide film according to claim 1.

5. A polyimide film comprising polyimide layer A comprising a polyimide and polyimide layer B comprising a polyimide wherein:
either one or both of the polyimide layer A and the polyimide layer B have properties (i) and (II) below:
(i) a thickness direction retardation Rth as calculated by the below equation of −5 nm or more and 100 nm or less per thickness of 10 μm; and
(ii) the polyimide contains a repeating unit represented by the following general formula (1):

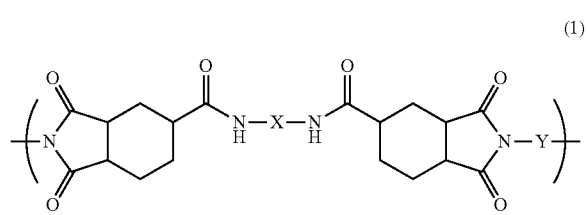
(1)

wherein X is a group selected from the group consisting of:

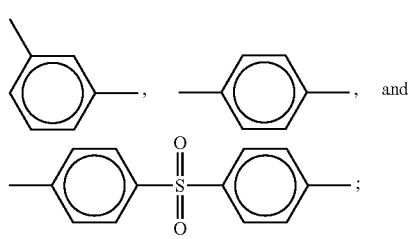

and
Y is a group selected from the group consisting of:

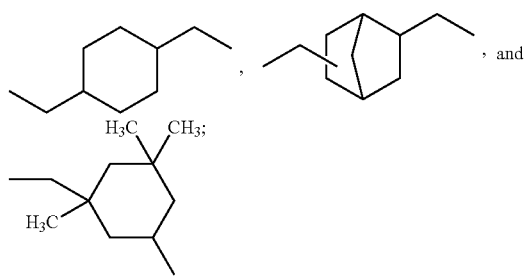

and
wherein the polyimide film has a thickness direction retardation Rth as calculated by the below equation of −5 nm or more and 100 nm or less per thickness of 10 μm, Retardation $Rth$ (nm)$=[nz-(nx+ny)/2]\times d$, wherein nx, ny and nz are respective refractive indexes for x-, y- and z-axis directions of an individual layer contained in the polyimide film or of the polyimide film measured using light with a wavelength of 550 nm; and d is a thickness of each layer in the polyimide film or of the polyimide film.

6. A polyamic acid comprising a repeating unit represented by the following general formula (1'):

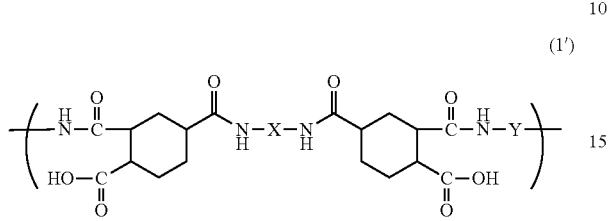

(1')

wherein X is a group selected from the group consisting of:

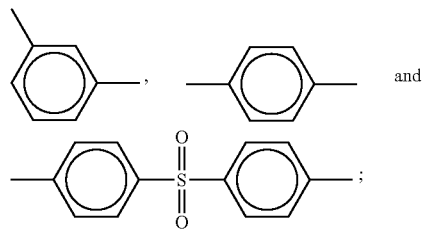

and
Y is a group selected from the group consisting of:

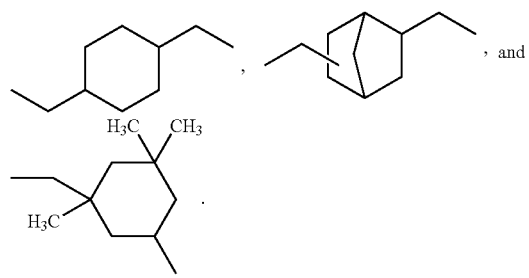

7. A dry film comprising the polyamic acid according to claim 6.

8. A polyamic acid varnish comprising the polyamic acid according to claim 6.

9. A polyimide obtained by curing the polyamic acid according to claim 6.

10. A method for manufacturing a polyimide laminate in which a substrate and a polyimide layer are laminated, the method comprising:
coating a substrate with the polyamic acid varnish according to claim 8; and
heating a film of the coated polyamic acid varnish in an inert gas atmosphere.

11. A method for manufacturing a polyimide laminate in which a substrate and a polyimide layer are laminated, the method comprising:
coating a substrate with the polyamic acid varnish according to claim 8; and
heating a film of the coated polyamic acid varnish under an atmosphere of 15 kPa or less.

12. A method for manufacturing a polyimide laminate comprising a substrate and a polyimide layer,
wherein a thickness direction retardation Rth of the polyimide layer as calculated by the below equation is −5 nm or more and 100 nm or less per thickness of 10 μm, the method comprising:
coating a substrate with a varnish containing polyamic acid a and polyamic acid b and heating the resultant coating to thereby obtain the polyimide layer, wherein either one or both of polyamic acid a and polyamic acid b are the polyamic acid according to claim 6, Retardation $Rth$ (nm)=$[nz-(nx+ny)/2] \times d$, wherein nx, ny and nz are respective refractive indexes for x-, y- and z-axis directions of the polyimide layer measured using light with a wavelength of 550 nm; and d is a thickness of the polyimide layer.

13. A method for manufacturing a polyimide laminate comprising a substrate, polyimide layer A and polyimide layer B,
wherein a thickness direction retardation Rth of a laminate, obtained by laminating polyimide layer A and polyimide layer B, as calculated by the below equation is −5 nm or more and 100 nm or less per thickness of 10 μm;
the method comprising:
coating a substrate with a varnish containing polyamic acid a and heating the resultant coating to thereby obtain the polyimide layer A, and
coating onto the polyimide layer A a varnish containing polyamic acid b and heating the resultant coating to thereby obtain the polyimide layer B, wherein either one or both of polyamic acid a and polyamic acid b are the polyamic acid according to claim 6, Retardation $Rth$ (nm)=$[nz-(nx+ny)/2] \times d$, wherein nx, ny and nz are respective refractive indexes for x-, y- and z-axis directions of an individual layer contained in the polyimide film or of the polyimide film measured using light with a wavelength of 550 nm; and d is a thickness of each layer of the polyimide film or of the polyimide film.

14. A method for manufacturing a display apparatus, the method comprising:
peeling off the substrate from the polyimide laminate obtained by the method according to claim 10 to thereby obtain a polyimide film; and
forming a device on the polyimide film.

15. The method for manufacturing a display apparatus according to claim 14, wherein the step for forming a device includes forming a thin film by vapor-phase growth method.

16. A method for manufacturing a display apparatus, the method comprising:
forming a device on the polyimide layer of the polyimide laminate obtained by the method according to claim 10; and
peeling off the polyimide layer on which the device is formed from the substrate.

17. The method for manufacturing a display apparatus according to claim 16, wherein the step for forming a device includes forming a thin film by vapor-phase growth method.

* * * * *